(12) United States Patent
Staring et al.

(10) Patent No.: US 12,444,998 B2
(45) Date of Patent: Oct. 14, 2025

(54) WIRELESS POWER TRANSFER

(71) Applicant: KONINKLIJKE PHILIPS N.V., Eindhoven (NL)

(72) Inventors: Antonius Adriaan Maria Staring, Eindhoven (NL); Aleksei Agafonov, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 18/716,182

(22) PCT Filed: Nov. 16, 2022

(86) PCT No.: PCT/EP2022/082098
§ 371 (c)(1),
(2) Date: Jun. 4, 2024

(87) PCT Pub. No.: WO2023/104456
PCT Pub. Date: Jun. 15, 2023

(65) Prior Publication Data
US 2025/0038581 A1   Jan. 30, 2025

(30) Foreign Application Priority Data

Dec. 8, 2021   (EP) ..................... 21213092

(51) Int. Cl.
*H02J 50/80* (2016.01)
*H02J 50/12* (2016.01)

(52) U.S. Cl.
CPC .............. *H02J 50/80* (2016.02); *H02J 50/12* (2016.02)

(58) Field of Classification Search
CPC .................. H02J 50/12; H02J 50/80
See application file for complete search history.

(56) References Cited

U.S. PATENT DOCUMENTS 10,742,472 B1 * 8/2020 Van Nee ............. H04L 27/3405
2006/0227857 A1 * 10/2006 Gaal ................. H04L 25/03159
375/150

(Continued)

FOREIGN PATENT DOCUMENTS

| EP | 3381106 B1 | 5/2019 |
| KR | 101649655 B1 | 8/2016 |
| WO | 2011120333 A1 | 10/2011 |

OTHER PUBLICATIONS

International Search Report and Written Opinion from PCT/EP2022/082098 mailed Jan. 26, 2023.
QI Specification.

*Primary Examiner* — Rexford N Barnie
*Assistant Examiner* — Joseph N Inge

(57) ABSTRACT

A power transmitter (101) provides power to a power receiver (105) via an inductive power transfer signal which is also used by the power receiver (105) for communication by load modulation. The power receiver (105) comprises a transmitter (509) arranged to transmit symbols in accordance with a first or second communication mode where the first mode modulates data symbols by a chip sequence from a set of sequences and the second communication mode does not. The power receiver (105) may transmit data symbols requesting a power transfer signal variation using a chip sequence from the set. A detector (515) may detect if the variation occurs, and if so a selector (513) selects the first communication mode and otherwise it selects the second communication mode. The approach may allow selection of an appropriate communication mode without requiring data to be transmitted from the power transmitter. The approach may provide improved backwards compatibility.

21 Claims, 8 Drawing Sheets

(56) References Cited

U.S. PATENT DOCUMENTS

| | | | |
|---|---|---|---|
| 2013/0035034 A1* | 2/2013 | Kim | H02J 7/00047 |
| | | | 455/41.1 |
| 2013/0058380 A1* | 3/2013 | Kim | H04W 76/14 |
| | | | 455/434 |
| 2014/0139034 A1* | 5/2014 | Sankar | H02J 50/80 |
| | | | 307/104 |
| 2017/0170686 A1* | 6/2017 | Van Wageningen | H02J 50/60 |
| 2017/0310119 A1* | 10/2017 | Taylor | H04B 5/79 |
| 2018/0342899 A1* | 11/2018 | Joye | H02J 50/80 |
| 2021/0314194 A1* | 10/2021 | Sengupta | H04L 27/2607 |

* cited by examiner

105

| SIG | ID | CFG | CE/0 | CE/x | CE/0 | CE/x | CE/0 | CE/x |

FIG. 7

WIRELESS POWER TRANSFER

CROSS-REFERENCE TO PRIOR APPLICATIONS

This application is the U.S. National Phase application under 35 U.S.C. § 371 of International Application No. PCT/EP2022/082098, filed on Nov. 16, 2022, which claims the benefit of EP Patent Application No. EP 21213092.6, filed on Dec. 8, 2021. These applications are hereby incorporated by reference herein.

FIELD OF THE INVENTION

The invention relates to wireless power transfer and in particular, but not exclusively, to power transfer for systems such as the Qi wireless power transfer Specification.

BACKGROUND OF THE INVENTION

Most present-day electrical products require a dedicated electrical contact in order to be powered from an external power supply. However, this tends to be impractical and requires the user to physically insert connectors or otherwise establish a physical electrical contact. Typically, power requirements also differ significantly, and currently most devices are provided with their own dedicated power supply resulting in a typical user having a large number of different power supplies with each power supply being dedicated to a specific device. Although, the use of internal batteries may avoid the need for a wired connection to a power supply during use, this only provides a partial solution as the batteries will need recharging (or replacing). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers having a tight coupling between a primary transmitter inductor/coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach, known as the Qi Specifications, has been defined and is currently being developed further. This approach allows power transmitter devices that meet the Qi Specifications to be used with power receiver devices that also meet the Qi Specifications without these having to be from the same manufacturer or having to be dedicated to each other. The Qi standard further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support efficient wireless power transfer, wireless power transfer systems, such as Qi based systems, utilize substantial communication between the power transmitter and the power receiver. Initially, Qi supported only communication from the power receiver to the power transmitter using load modulation of the power transfer signal. Thus, initial Qi devices support only unidirectional communication from the power receiver to the power transmitter.

However, developments of the standard have introduced bidirectional communication and many functions are supported by communication exchanges between the power receiver and the power transmitter. In many systems, the communication from the power transmitter to the power receiver is accomplished by modulating the power transfer signal.

In some systems, it has been proposed to use separate and dedicated communication functionality such as e.g. Bluetooth or NFC (Near Field Communication) based communication. However, whereas such approaches may tend to provide efficient operation in many scenarios it is also associated with a number of disadvantages, including requiring dedicated and complex communication circuitry and potentially a reduced certainty that the power transmitter is indeed communicating with the power receiver that is being supplied with power. Also, backwards compatibility, e.g. with Qi based devices, may be problematic for newer devices based on separate communication.

Communicating using load modulation of the power transfer signal transferring power to the power receiver may however also tend to have some associated disadvantages. For example, the load modulation may tend to introduce some electrical noise including both noise to the signals of the devices as well as radiated electromagnetic noise. The load modulation may increase electromagnetic interference to other devices and maintaining sufficient or optimal electromagnetic compatibility has been found to be challenging.

It has also been found in practice that load modulation may result in the introduction of undesired spurious oscillations to the drive signal and the power transfer signal. Another disadvantage is that the load modulation of the power transfer signal may result in acoustic noise. Such noise may result from the impact on mechanical elements of the variations to the electromagnetic field caused by the load modulation, and specifically it may cause mechanical elements to move and vibrate resulting in potential acoustic noise being generated.

In some cases, load modulation communication as e.g. used in the initial versions of the Qi Specifications may not have perfect reliability and some bit errors may possibly occur in some cases. For example, high levels of noise may result in bit errors and/or may require an increased modulation depth which may result in increased electrical or acoustic noise resulting from the load modulation.

Although it may in some ways be desired to change to a different communication approach, maintaining backwards compatibility or reducing the amount of change needed for existing designs and approaches is a prime challenge that often renders this a challenging prospect.

A particular problem with a continuing developing technical Specification or Standard is that it may result in a system in which many different devices according to different versions of the standards are simultaneously deployed. It is typically required that such different devices must be able to work together. For example, the development of the Qi Specification has resulted in many deployed power transmitters and power receivers complying with different versions of the Specification, and with it being required that all of these interwork with each other. A particular challenging issue relates to communication where it is required/desired that different versions of the devices can communicate efficiently and reliably. Indeed, it is even required that later devices supporting full bidirectional communication can efficiently interwork with legacy devices developed to only support unidirectional communication. Further, not only is it required that devices can interwork with each other, but it is desired that more complex devices can efficiently and reliable adapt operation to preferably select the most optimum operation and communication that is supported by the complementary devices. Thus, when power transfer is initialized between two devices, a challenge faced by the devices is to interact to establish the optimum interworking based on the specific capabilities of the devices. Such adaptation is challenging, especially in cases where one of the devices is only capable of unidirectional communication thereby preventing negotiation protocols and algorithms being utilized.

Hence, an improved approach would be advantageous, in particular, an approach allowing increased flexibility, reduced cost, reduced complexity, improved power transfer operation, increased reliability, reduced communication errors, improved backwards compatibility, improved electromagnetic compatibility, reduced electrical and/or acoustic noise, improved communication, improved backwards compatibility, facilitated and/or improved adaptation to different capabilities and functionality of different devices, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided power receiver for wirelessly receiving power from a power transmitter via an electromagnetic power transfer signal; the power receiver comprising: an input circuit comprising a receiver coil arranged to extract power from the power transfer signal; a transmitter arranged to transmit a set of data symbols to the power transmitter by load modulating the power transfer signal, each data symbol of the data sequence being modulated by a sequence of modulation load values corresponding to a chip sequence of a first set of chip sequences, chip sequences of the first set of chip sequences being linked to different data symbol values, and the set of data symbols comprising a request for a given variation of the power transfer signal; a detector arranged to monitor the power transfer signal to detect the given variation of the power transfer signal; a selector arranged to select a first communication mode as a selected communication mode if the given variation is detected and to select a second communication mode as the selected communication mode if the given variation is not detected, the first communication mode comprising each data symbol being modulated by a sequence of modulation load values corresponding to a chip sequence of the first set of chip sequences and the second communication mode not comprising modulating any data symbol by a sequence of modulation load values corresponding to any chip sequence of the first set of chip sequences; and wherein the transmitter is arranged to transmit data symbols to the power transmitter during a power transfer phase using the selected communication mode.

The invention may allow improved performance in many embodiments and may in particular in many embodiments allow improved communication between a power receiver and a power transmitter. It may allow improved power transfer in many embodiments.

The approach may allow improved communication, and in many embodiments may allow improved trade-off between different parameters and operating characteristics. The approach may e.g. allow highly reliable communication yet allow reduced modulation depth to be used. The approach may reduce electric noise and/or electromagnetic interference and allow improved electromagnetic compatibility. The approach may in many cases reduce or prevent acoustic noise.

The approach may in many scenarios allow an improved trade-off between different parameters including computational resource requirements, data detection accuracy, bit error rate, data rate etc.

The approach may allow advantageous backwards compatibility in many systems and may in many embodiments allow facilitated deployment into an existing system. The approach may allow improved interworking and adaptation to different device capabilities. The approach may for example allow improved interworking with legacy devices thereby facilitating introduction of enhanced features.

The approach may in many scenarios allow improved operation and adaptation without requiring or relying on data communication from the power transmitter to the power receiver or even on the existence of a communication channel from the power transmitter to the power receiver.

The approach may e.g. allow relatively easy modification of existing approaches, such as those used by the Qi Specifications. Specifically, the approach may allow enhancement of communications in systems such as Qi Specification systems including devices operating in accordance with the Baseline Power Profile (BPP) of the Qi Specification which does not include any power transmitter to power receiver communication.

A chip sequence may be a sequence/pattern of modulation load values. Each of these modulation load values may be constant within a chip duration. Chip sequences for different data symbols have different sequences/patterns of modulation load values.

In many embodiments, the length of the chip sequences is not below 15 and not above 256 chips.

The set of data symbols may comprise one or more data symbols. The data symbols may in some embodiments be bits. The selection of the first and/or second communication mode may consider other parameters. For example, the first communication mode may in the case of the given variation being detected be selected from a plurality of possible communication modes. Similarly, the second communication mode may in the case of the given variation not being detected be selected from a different plurality of possible communication modes. The selections from the possible communication modes may be in response to other parameters than the variation of the power transfer signal.

The given variation may in many embodiments be a predetermined variation.

In accordance with an optional feature of the invention, the second communication mode comprises each data symbol being modulated by a sequence of modulation load values corresponding to a chip sequence of a second set of chip sequences.

This may provide improved performance and/or operation and/or facilitate implementation and/or deployment in many scenarios.

In accordance with an optional feature of the invention, chip sequences of the second set of chip sequences being linked to different data symbol values, each chip sequence of the first set of chip sequences having a first length and each chip sequence of the second set of chip sequences having a second length different from the first length.

This may provide improved performance and/or operation and/or facilitate implementation and/or deployment in many scenarios.

The approach may allow an efficient selection and adaptation of a suitable communication mode and modulation approach.

The second length may be shorter than the first length and often by a factor of no less than 2, 4, 8, 16, 32, or 64 times.

In accordance with an optional feature of the invention, the given variation is a variation of at least one of a power level of the power transfer signal and a frequency of the power transfer signal.

This may provide improved performance and/or operation in many scenarios.

In accordance with an optional feature of the invention, the set of data symbols comprise at least one power level change request for the power transfer signal.

This may provide improved performance and/or operation and/or facilitate implementation and/or deployment in many scenarios. It may in many implementations reduce the complexity and/or changes required to implement the chip sequence based communication. It may further typically allow facilitated and/or more accurate determination of whether the given variation is present or not.

In accordance with an optional feature of the invention, the set of data symbols comprise at least one power control loop error message.

This may provide improved performance and/or operation and/or facilitate implementation and/or deployment in many scenarios. It may in many embodiments reduce the complexity and/or changes required to implement the approach. It may further typically allow facilitated and/or more accurate determination of whether the given variation is present or not.

In accordance with an optional feature of the invention, the transmitter is arranged to transmit a further set of data symbols using the second communication mode, the further set of data symbols requesting a different variation of the power transfer signal, the different variation being a variation that is different to the given variation; and the detector is arranged to detect the given variation dependent on whether a change of the power transfer signal is a closer match to the different variation or whether the change of the power transfer signal is a closer match to a combination of the different variation and the given variation.

This may provide improved performance and/or operation and/or facilitate implementation and/or deployment in many scenarios. The different variation may specifically be a variation opposing the given variation.

In accordance with an optional feature of the invention, the transmitter is arranged to transmit the set of data symbols during a power transfer phase.

This may provide improved performance and/or operation in many scenarios and embodiments.

In accordance with an optional feature of the invention, the request for the expected variation of the power transfer signal is a request for an end of power transfer; and the selector is arranged to select the first communication mode for a subsequent power transfer phase if an end of the power transfer phase is detected.

This may provide improved performance and/or operation and/or facilitate implementation and/or deployment in many scenarios. It may often provide an efficient and/or easy to detect variation while typically utilizing existing operations and messages.

In accordance with an optional feature of the invention, the transmitter is arranged to transmit the set of data symbols in response to detecting a detection power transfer signal from the power transmitter, and the expected variation is a variation of the detection power transfer signal.

This may provide improved performance and/or operation and/or facilitate implementation and/or deployment in many scenarios. A detection power transfer signal may specifically be a ping signal.

In accordance with an optional feature of the invention, the power receiver further comprises the transmitter transmitting a test set of data symbols using the first communication mode and with a first value for a communication parameter, the test set of data symbols comprising a request for a second given variation of the power transfer signal, and the selector is arranged to set the communication parameter to a first value if a variation of the power transfer signal matches the second given variation and to set the communication parameter to a different value otherwise.

This may provide improved performance and/or operation and/or facilitate implementation and/or deployment in many scenarios. The approach may allow an efficient adaptation of the communication parameter without requiring communication from the power transmitter to the power receiver.

In some embodiments, the communication parameter is at least one of a chip sequence length and a load modulation depth.

This may provide improved performance and/or operation and/or facilitate implementation and/or deployment in many scenarios.

In accordance with another aspect of the invention, there is provided a transmitter for wirelessly providing power to a power receiver via an electromagnetic power transfer signal; the power transmitter comprising: an output circuit comprising a transmitter coil arranged to generate the power transfer signal in response to a drive signal being applied to the output circuit; a driver arranged to generate the drive signal; a load detector for detecting load variations for the power transfer signal; a detector for detecting a validly received data symbol in response to a correlation between a chip sequence of a set of chip sequences and load variations of the power transfer signal exceeding a threshold, chip sequences of the set of chip sequences being linked to different data symbol values; an adapter arranged to apply a variation to the power transfer signal in response to the detection of the validly received data symbol; a selector arranged to select a first communication mode as a selected communication mode in response to the detection of the validly received data symbol and to select a second communication mode as the selected communication mode otherwise, the first communication mode comprising each data symbol being received in response to a correlation of the set of chip sequences and load variations of the power transfer signal, and the second communication mode not comprising each data symbol being received in response to a correlation of the set of chip sequences and load variations of the power transfer signal; and a load modulation receiver arranged to determine load modulation data symbols received from the power receiver in accordance with the selected communication mode.

In accordance with another aspect of the invention, there is provided a method of operation for a power receiver for wirelessly receiving power from a power transmitter via an electromagnetic power transfer signal; the method comprising: an input circuit comprising a receiver coil extracting power from the power transfer signal; transmitting a set of data symbols to the power transmitter by load modulating the power transfer signal, each data symbol of the data sequence being modulated by a sequence of modulation load values corresponding to a chip sequence of a first set of chip sequences, chip sequences of the first set of chip sequences being linked to different data symbol values, and the set of data symbols comprising a request for a given variation of the power transfer signal; monitoring the power transfer signal to detect the given variation of the power transfer signal; selecting a first communication mode as a selected communication mode if the given variation is detected and to select a second communication mode as the selected communication mode if the given variation is not detected, the first communication mode comprising each data symbol being modulated by a sequence of modulation load values corresponding to a chip sequence of the first set of chip sequences and the second communication mode not comprising modulating any data symbol by a sequence of modulation load values corresponding to any chip sequence of the first set of chip sequences; and transmitting data symbols to the power transmitter during a power transfer phase using the selected communication mode.

In accordance with another aspect of the invention, there is provided a method of operation for a power transmitter for wirelessly providing power to a power receiver via an electromagnetic power transfer signal; the method comprising: a transmitter coil generating the power transfer signal in response to a drive signal being applied to the transmitter coil; generating the drive signal; detecting load variations for the power transfer signal; detecting a validly received data symbol in response to a correlation between a chip sequence of a set of chip sequences and load variations of the power transfer signal exceeding a threshold, chip sequences of the set of chip sequences being linked to different data symbol values; applying a variation to the power transfer signal in response to the detection of the validly received data symbol; selecting a first communication mode as a selected communication mode in response to the detection of the validly received data symbol and selecting a second communication mode as the selected communication mode otherwise, the first communication mode comprising each data symbol being received in response to a correlation of the set of chip sequences and load variations of the power transfer signal, and the second communication mode not comprising each data symbol being received in response to a correlation of the set of chip sequences and load variations of the power transfer signal; and determining load modulation data symbols received from the power receiver in accordance with the selected communication mode.

It will be appreciated that the comments provided with respect to the first aspect mutatis mutandis also apply to the other aspects.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which:

FIG. 7 illustrates an example of a communication exchange in accordance with some embodiments of the invention.

DETAILED DESCRIPTION OF THE EMBODIMENTS

The following description focuses on embodiments of the invention applicable to a high power wireless power transfer system utilizing a power transfer approach such as known from the Qi Specification. However, it will be appreciated that the invention is not limited to this application but may be applied to many other wireless power transfer systems.

Figure 1:
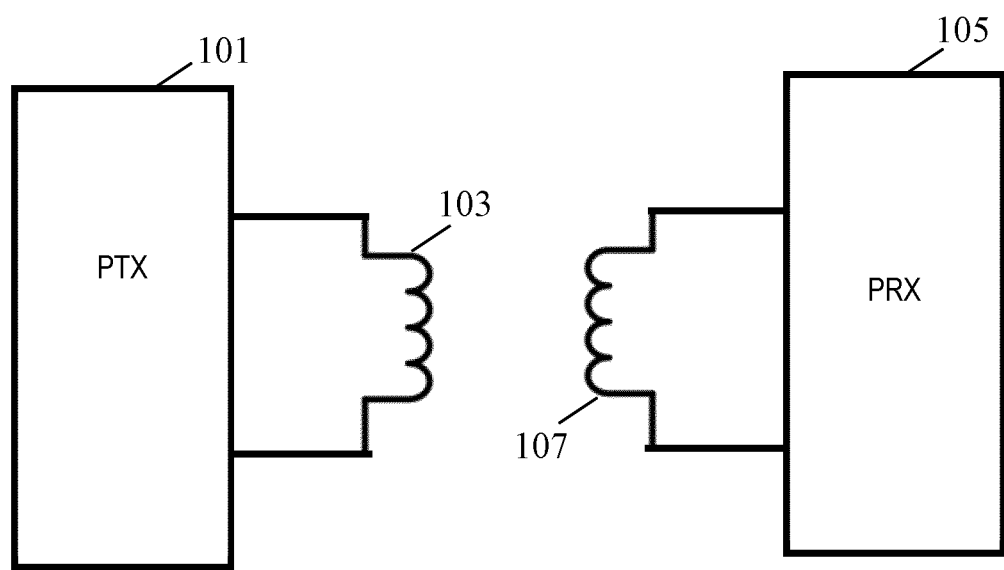
FIG. 1 illustrates an example of elements of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides an inductive electromagnetic power transfer signal which may inductively transfer power from the power transmitter 101 to the power receiver 105. Specifically, the power transmitter 101 generates an electromagnetic signal, which is propagated as a magnetic flux by the transmitter coil or inductor 103. The power transfer signal may typically have a frequency between around 20 kHz to around 500 kHz, and in many practical systems may be around 120-150 kHz. The transmitter coil 103 and the power receiving coil 107 are loosely coupled and thus the power receiving coil 107 picks up (at least part of) the power transfer signal from the power transmitter 101. Thus, the power is transferred from the power transmitter 101 to the power receiver 105 via a wireless inductive coupling from the transmitter coil 103 to the power receiving coil 107. The term power transfer signal is mainly used to refer to the inductive signal/magnetic field between the transmitter coil 103 and the power receiving coil 107 (the magnetic flux signal), but it will be appreciated that by equivalence it may also be considered and used as a reference to an electrical signal provided to the transmitter coil 103 or picked up by the power receiving coil 107.

In the example, the power receiver 105 is specifically a power receiver that receives power via the receiver coil 107. However, in other embodiments, the power receiver 105 may comprise a metallic element, such as a metallic heating element, in which case the power transfer signal directly induces eddy currents resulting in a direct heating of the element.

In the following, the operation of the power transmitter 101 and the power receiver 105 will be described with specific reference to an embodiment generally in accordance with the Qi Specifications (except for the herein described (or consequential) modifications and enhancements). Many wireless power transfer systems utilize resonant power transfer where the transmitter coil 103 is part of a resonance circuit and typically the receiver coil 107 is also part of a resonance circuit. In many embodiments, the resonance circuits may be series resonance circuits and thus the transmitter coil 103 and the receiver coil 107 may be coupled in series with a corresponding resonance capacitor. The use of resonance circuits tends to provide a more efficient power transfer.

Normally, a wireless power transfer system employs a power control loop in order to steer the system towards the appropriate operating point. This power control loop changes the amount of power that is transmitted from the power transmitter to the power receiver. The received power (or voltage or current) can be measured and together with the setpoint power value, an error signal can be generated. The power receiver sends this error signal to the power control function in the power transmitter to reduce the static error, ideally to zero.

Figure 2:
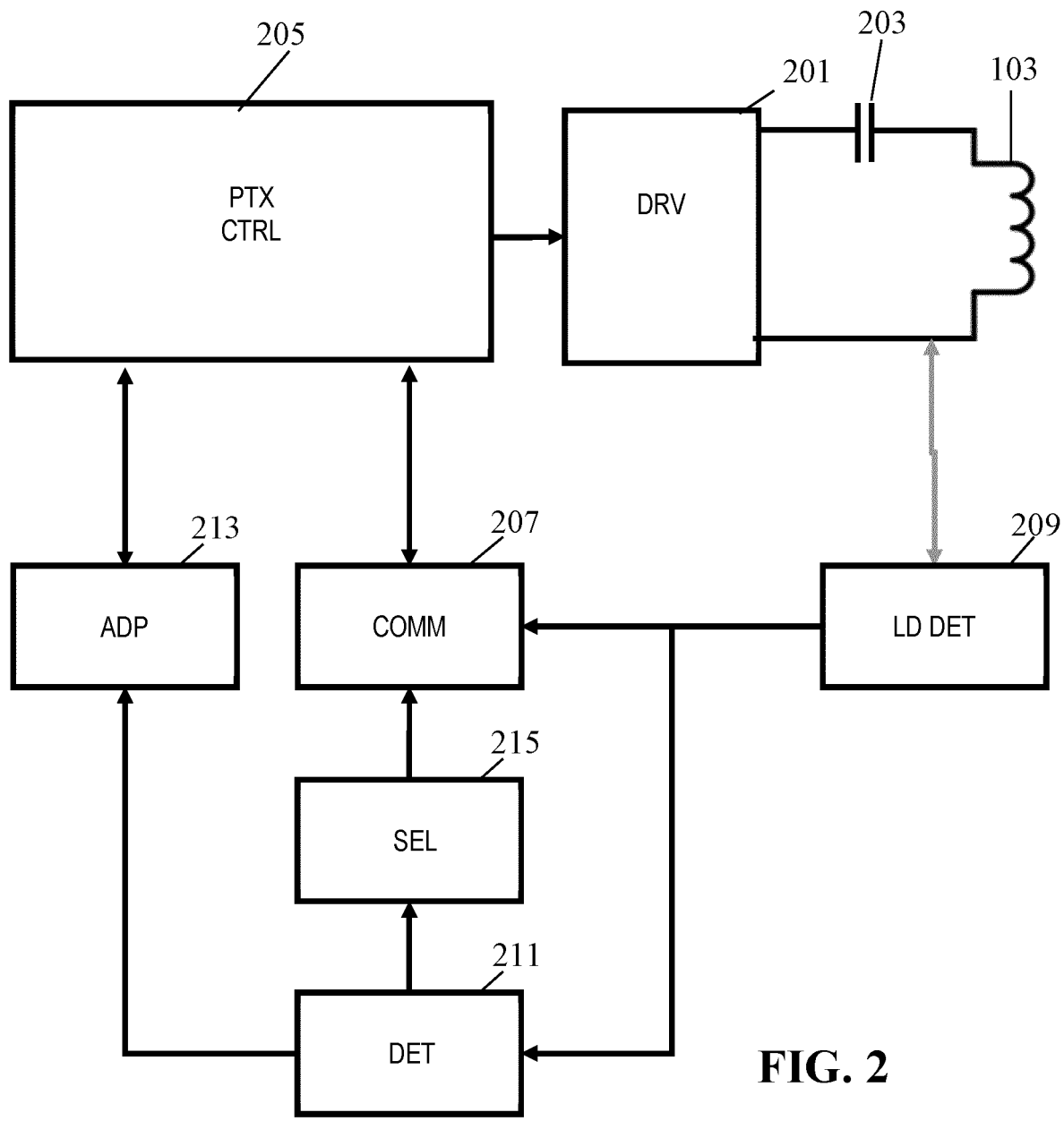
FIG. 2 illustrates an example of elements of a power transmitter in accordance with some embodiments of the invention.

FIG. 2 illustrates elements of the power transmitter 101 of FIG. 1 in more detail.

The power transmitter 101 includes a driver 201 which can generate a drive signal that is fed to the transmitter coil 103 which in return generates the electromagnetic power transfer signal thereby providing a power transfer to the power receiver 105. The transmitter coil 103 is part of an output resonance circuit which comprises the transmitter coil 103 and a capacitor 203. In the example, the output resonance circuit is a series resonance circuit, but it will be appreciated that in other embodiments, the output resonance circuit may be a parallel resonance circuit. It will be appreciated that any suitable resonance circuit may be used including one using multiple inductors and/or capacitors.

Figure 3:
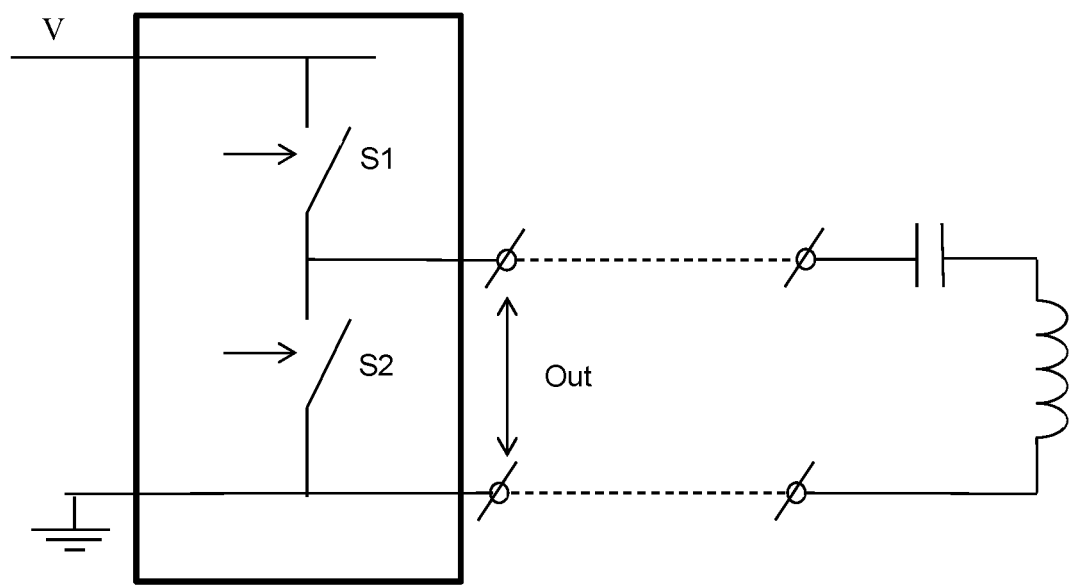
FIG. 3 illustrates an example of a half bridge inverter for a power transmitter.
Figure 4:
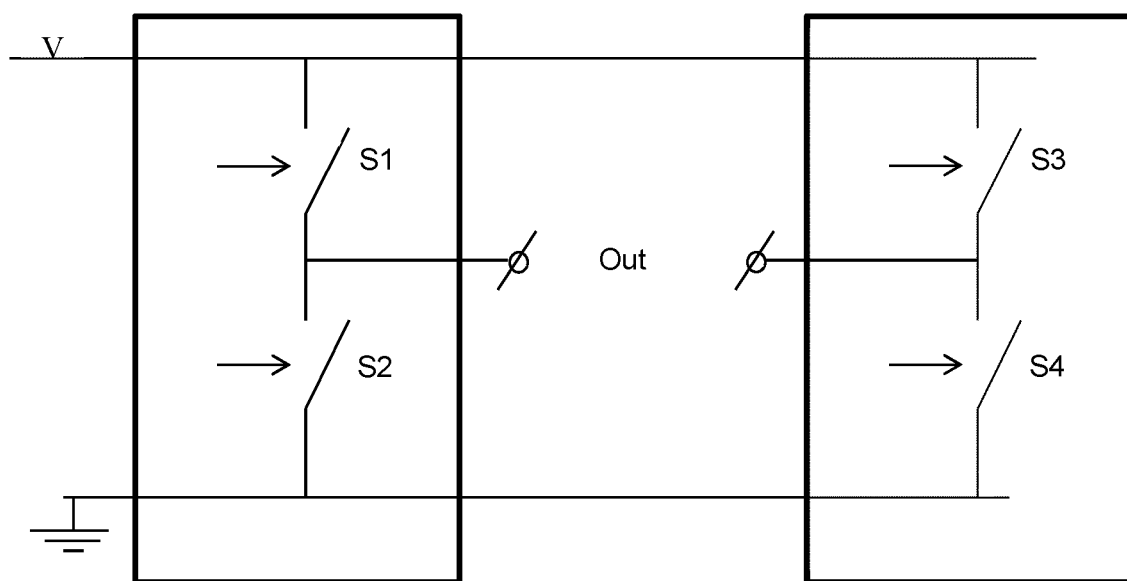
FIG. 4 illustrates an example of a full bridge inverter for a power transmitter.

The driver 201 generates the current and voltage which is fed to the output resonance circuit and thus to the transmitter coil 103. The driver 201 is typically a drive circuit in the form of an inverter which generates an alternating signal from a DC Voltage. The output of the driver 201 is typically a switch bridge generating the drive signal by the appropriate switching of switches of the switch bridge. FIG. 3 shows a half-bridge switch bridge/inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically, the output of the inverter is connected to the transmitter inductor via a resonance capacitor. FIG. 4 shows a full-bridge switch bridge/inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a square-wave signal at the output. The switches are opened and closed with the desired frequency.

The power transmitter 101 further comprises a power transmitter controller 205 which is arranged to control the operation of the power transmitter 101 in accordance with the desired operating principles. Specifically, the power transmitter 101 may include many of the functionalities required to perform power control in accordance with the Qi Specification.

The power transmitter controller 205 is in particular arranged to control the generation of the drive signal by the driver 201, and it can specifically control the power level of the drive signal, and accordingly the level of the generated power transfer signal. The power transmitter controller 205 comprises a power loop controller controlling a power level of the power transfer signal in response to the power control messages received from the power receiver 105 during the power transfer phase.

Figure 5:
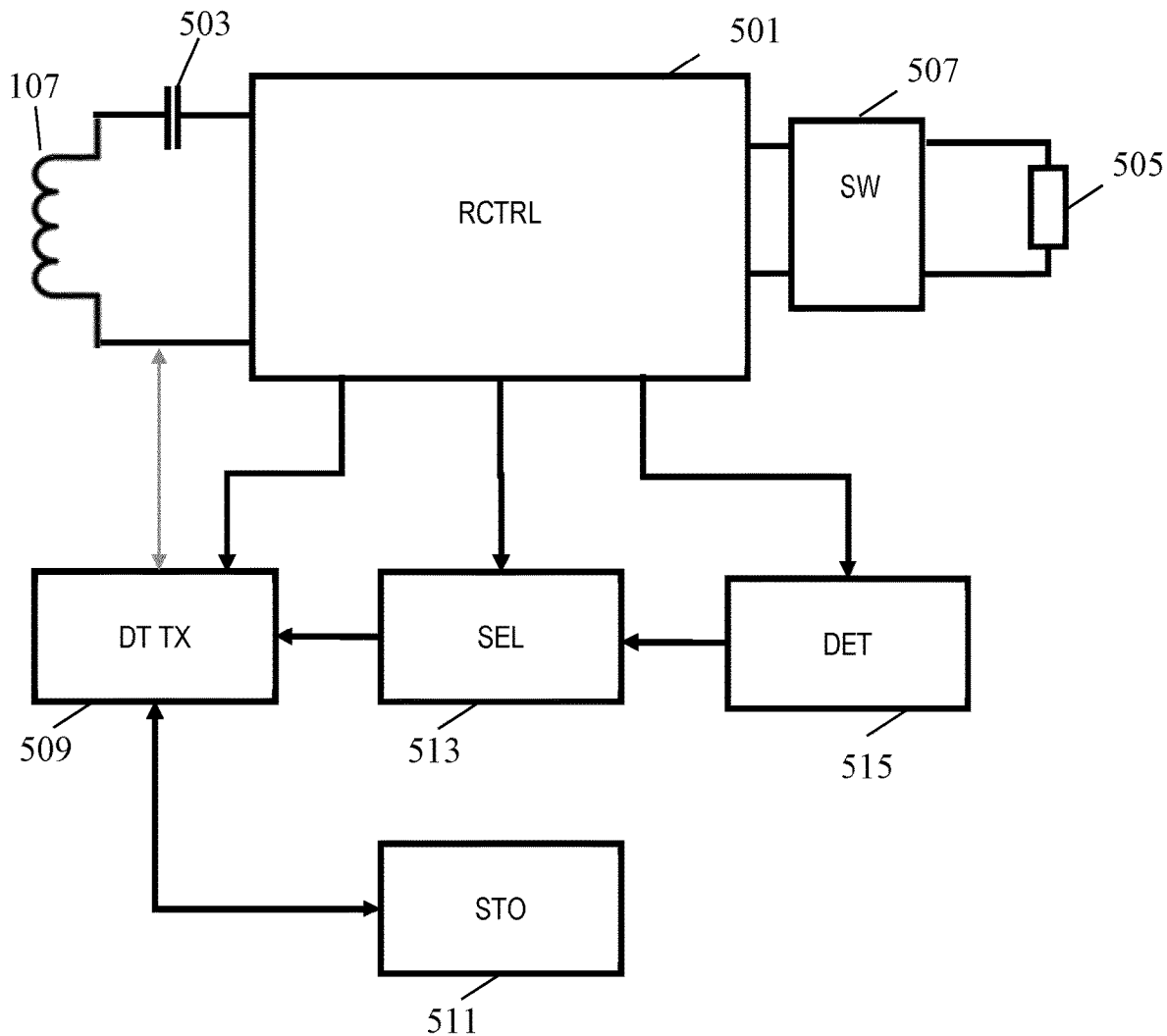
FIG. 5 illustrates an example of elements of a power receiver in accordance with some embodiments of the invention.

FIG. 5 illustrates some exemplary elements of the power receiver 105. In the example, the receiver coil 107 is coupled to a power receiver controller 501 via a capacitor 503 which together with the receiver coil 107 forms an input resonance circuit. Thus, the power transfer may be a resonant power transfer between resonance circuits. In other embodiments, only one, or none, of the power receiver and the power transmitter may utilize a resonance circuit for power transfer.

The power receiver controller 501 couples the receiver coil 107 to a load 505 via a switch 507. The power receiver controller 501 includes a power control path which converts the power extracted by the receiver coil 107 into a suitable supply for the load 505. In some embodiments, the power receiver controller 501 may provide a direct power path which simply connects the input resonance circuit to the switch 507 or load 505, i.e. the power path of the power receiver controller 501 may simply be implemented by two wires. In other embodiments, the power path may include e.g. rectifiers and possibly smoothing capacitors to provide a DC voltage. In yet other embodiments, the power path may include more complex functions, such as e.g. voltage control circuitry, impedance matching circuitry, current control circuitry etc. Similarly, it will be appreciated that the switch 507 may only be present in some embodiments and that in some embodiments the load 505 may permanently be coupled to the input resonance circuit.

In addition, the power receiver controller 501 may include various power receiver controller functionality required to perform power transfer, and in particular functions required to perform power transfer in accordance with the Qi Specifications.

The power receiver 105 is arranged to transmit data to the power transmitter 101. Such data may specifically include power control loop error messages used to implement a feedback power loop for controlling the power level of the power transfer signal during power transfer as will be known to the skilled person. The power receiver may in many embodiments be capable of transmitting a range of different messages serving different purposes as known to the skilled person. For example, a range of different messages such as those specified in the Qi Specifications may be transmitted. Messages may comprise one or more data bits/symbols.

The power receiver is arranged to transmit messages to the power transmitter using load modulation.

As will be well known to the skilled person, for load modulation, changes in the loading of the power transfer signal may be introduced by the power receiver where the changes are in accordance with data values to be transmitted. These changes can then be detected by the power transmitter in order to decode the data from the power receiver.

Load modulation may be used as the method for the power receiver to communicate control messages, or other data, to the power transmitter in accordance with e.g. the Qi wireless power standard.

There are typically two main ways of performing load modulation, namely either to directly change the resistive load/power extraction of the input circuit and/or to detune the resonance of the input circuit e.g. by changing a reactive loading of the input circuit (typically switching a capacitor in/out in line with data to be transmitted). Similar approaches may be used by the power receiver for load modulating the power transfer signal.

Correspondingly, at the power transmitter, detection approaches such as those known for Qi Specification systems may be used to detect the load variations. For example, a direct measurement of a power level or current amplitude of the drive signal may be used as indications of the loading, and thus load modulation variations introduced by the power receiver as will be known to the skilled person.

The power receiver 105 comprises a data transmitter 509 which is arranged to transmit data to the power transmitter 101 by load modulating the power transfer signal. For example, the data transmitter 509 may be arranged to switch in/out a communication capacitor e.g. positioned in parallel with the power receiver controller 501 or with the resonance capacitor 503 thereby being able to vary the resonance frequency and the loading of the power transfer signal.

The data transmitter 509 may be coupled to the power receiver controller 501 and may be arranged to receive data from the power receiver controller 501 for transmission to the power transmitter.

For example, the data transmitter 509 may receive power error control data from the power receiver controller 501 and may transmit corresponding power error control messages to the power transmitter 101 using load modulation. In operation, the system is typically arranged to control the drive signal such that the power transfer signal attains suitable operating parameters/properties and such that the power transfer operates at a suitable operating point. In order to do so, the power transmitter is arranged to control a parameter of the drive signal using a power control loop where a power property of the power transfer signal/drive signal is controlled in response to power control error messages that are received from the power receiver.

At regular, and typically frequent, intervals, the power receiver transmits a power control error message to the power transmitter. In some embodiments, a direct power setpoint change message may be transmitted indicating a desired absolute power level (rather than a relative error message). The power receiver 105 comprises functionality for supporting such a power control loop, e.g. the power receiver controller 501 may continuously monitor the power or voltage of a load signal provided to the load and detect whether this is above or below a desired value. It may at regular intervals generate a power control error message which requests that the power level of the power transfer signal is increased or decreased, and it may transmit this power control error message to the power transmitter. Such error control messages, as well as other messages, may be transmitted by load modulation.

The data transmitter 509 is arranged to transmit data to the power transmitter using different modes, corresponding to different load modulation transmission modes.

In a first communication mode, the data transmitter 509 is arranged to transmit data symbols by load modulating the power transfer signal by a sequence of modulation load values corresponding to a chip sequence. The chip sequence is selected from a first set of chip sequences, and in the example the data transmitter 509 is coupled to a chip sequence store 511 in which the first set of chip sequences is stored. Typically, the set of chip sequences comprises a chip sequence for each possible data symbol value. For example, if binary communication is used, the first set of chip sequences may comprise only two chip sequences. It will be appreciated that the chip sequence store 511 may store the chip sequences in any suitable form and does not need to store a full sequence for each possible data symbol. For example, one or more chip sequences may be represented by a relationship to another chip sequence. For example, for binary communication, the chip sequence store 511 may only store a single chip sequence corresponding to one of the binary data values. The chip sequence for the other binary data value may be represented by the same stored bit sequence as it may be given as the inverse of the stored bit sequence. Thus, often the first set of chip sequences utilizes complementary inverse chip sequences for pairs of data symbols and therefore only half of the used chip sequences are typically explicitly stored in the chip sequence store 511 with the remaining chip sequences being automatically and implicitly stored as the inverse of these.

The chip sequences in the first set are typically of the same length.

Load modulation may provide advantageous operation in many systems and applications and tends to provide reliable and low complexity operation suitable for power transfer systems where a power transfer signal is generated for the purpose of transferring power. The reuse of the power transfer signal as a communication carrier may typically reduce complexity and require less circuitry thereby reducing cost. The Qi Specifications were originally implemented with unilateral communication from the power receiver to the power transmitter by using a load modulation with a modulation symbol shape that allowed easy differentiation between binary data values.

However, load modulation as used in e.g. Qi systems may also have some associated disadvantages. Such disadvantages may e.g. be related to issues such as electromagnetic compatibility, communication quality (bit error rate), and audible noise.

The load modulation may create additional components in the electromagnetic spectrum causing additional electromagnetic interference and electrical noise. Also, it has been found that in many cases, the changes to the electromagnetic field caused by the load modulation may cause mechanical forces and movement that result in audible noise. It has also been found that strong load modulation may disturb the energy balance in the wireless power system, resulting in spurious oscillations within the communication carrier spectrum. In the presence of spurious oscillations, the wireless power transmitter often cannot properly demodulate the signal and therefore it has to interrupt power delivery to maintain safe operations.

The problems tend to be exacerbated for higher power transfer levels. Indeed, as the power levels of the power transfer signal increase, it is typically required that the load change for load modulation increases as well. Typically, the load modulation is required to be a suitable fraction of the power level, or maximum power level, of the power transfer signal. For example, the load modulation caused by the load modulation may be required to have a magnitude of no less than e.g. about 1% of the general loading of the power receiver (i.e. the load variation for the receiver coil caused by the load modulation may be required to be no less than 1% of the total load of the receiver coil 107). Qi was originally introduced for lower power applications of less than 5 W or so. For such lower power levels, the impact of the load modulation disadvantages is relatively manageable or even substantially insignificant. However, the maximum power levels for Qi have been increased to currently a maximum value of 15 W and work is ongoing to increase this further to a maximum level of 45 W. However, for such power levels, the above mentioned disadvantages tend to be significant, and they may provide a major obstacle to the further development of the Qi Specifications.

The system of FIGS. 1, 2, and 5 may in accordance with the first communication mode utilize an approach which in many situations may address one or more of the issues associated with load modulation. In the first communication mode, load modulation is employed, but each symbol is represented by a chip sequence comprising a plurality of chips, and typically with a sequence comprising 15 to 127 chips. Thus, rather than simply varying the load in accordance with each symbol or bit, the data transmitter 509 is arranged to transmit a given symbol (typically bit) by a series of load changes and variations where the changes and variations are different for each symbol. Specifically, a chip sequence may be defined for each symbol and when transmitting a given symbol, the data transmitter 509 may retrieve the chip sequence for that specific symbol and proceed to load modulate the power transfer signal in accordance with the chip sequence for the symbol.

When the power transmitter is capable of supporting the first communication mode, it may detect the load modulation by considering the whole sequence, and specifically the power transmitter may seek to determine the received symbol as the one for which a detected load variation pattern most closely matches the chip sequence pattern for that symbol.

Such an approach may in particular allow the modulation depth, i.e. the magnitude of the load variations to be reduced substantially which may for example reduce electromagnetic noise and interference, may reduce acoustic noise, and may reduce spurious oscillations. It may also in many embodiments result in improved signal to noise ratios and may result in a substantially improved and often more reliable communication with e.g. often a lower bit error rate. Thus, a general overall improved power transfer can be achieved.

In many embodiments, binary communication may be used where only two data symbol values are possible (corresponding to a "0" bit value or a "1" bit value). In such cases, one bit value may be represented by a given chip sequence and the other bit value may be associated with the inverse bit sequence, i.e. the bit sequence that results from changing each chip value to the opposite value. The two bit sequences are thus typically complementary with one resulting from the other by multiplication by −1 (with the chip values being represented by +1 and −1).

A particular advantage in such a case is that demodulation is particularly easy as a single correlation can be used to differentiate between the bit values as the magnitude of the correlation is the same for the chip sequences, but the signs of the correlation values are opposite.

The following description will focus on such binary communication, but it will be appreciated that the invention is not limited only to binary communication.

Thus, the data transmitter 509 may be arranged to receive data symbols, typically from the power receiver controller 501, to be transmitted to the power transmitter, it may proceed to determine a corresponding chip sequence and load modulate the power transfer signal by this chip sequence. Typically, the data symbols are binary but in some cases higher order modulation symbols may be used (i.e. with more than two possible values). In some cases, such higher order data symbols may correspond to a combination of received data bits. For example, two bits may be combined into a single quaternary data symbol. Such combination may be possible both when the data bits are related and when they are e.g. completely independent.

In the example, the data transmitter 509 is specifically coupled to a chip sequence store 511 in which the different chip sequences for different data symbols are stored. The chip sequence store 511 may store a set of reference chip sequences where each reference chip sequence is linked to a specific data symbol value. The load data transmitter 509 may in response to receiving a data symbol for transmission proceed to retrieve the corresponding chip sequence from the chip sequence store 511. Thus, the data transmitter 509 may specifically retrieve the chip sequences of the first set of chip sequences used in the first communication mode from the chip store 511.

Figure 6:
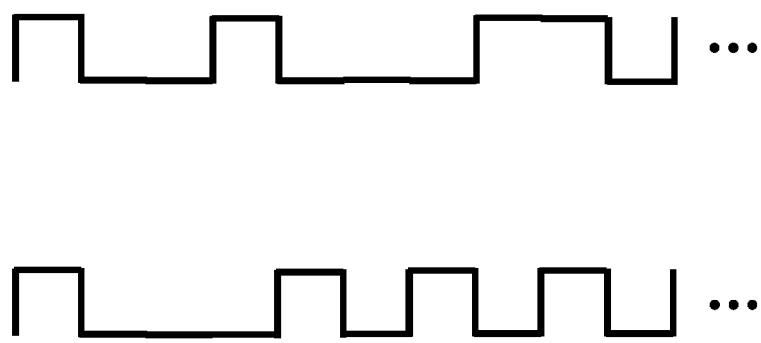
FIG. 6 illustrates an example of chip sequences.

FIG. 6 illustrates an example of parts of two possible chip sequences. Each chip sequence comprises a sequence of chips with each chip having constant modulation load level selected from a set of modulation levels. Typically, the set of modulation levels is two, corresponding to a binary chip sequence where the modulation load levels may switch between two possible levels. A symbol time is thus divided into a plurality of chip intervals with the modulation load level for each chip interval being selected from a predetermined set of modulation load levels and with the modulation load level sequences of the chips being different for different chip sequences. Typically, each sequence includes at least ten chips, and often substantially more. In many embodiments, each chip sequence may have a length of $2^N-1$ where N is an integer of typically no less than 4.

Longer chip sequences may provide improved noise suppression etc. but may also reduce the data rate as the symbol time increases for a given chip rate. Increased chip sequence lengths also increase complexity and resource demand, especially at the receiver where correlation with longer sequences may substantially require the number of computations required. A typical suitable value is N=5 and this a chip length of 31 chips.

Each of the stored chip sequences is assigned to a data symbol. Thus, each possible data symbol value that may need to be transmitted to the power transmitter may have a linked/associated chip sequence. For example, where only two data symbols are possible, i.e. where a binary communication is implemented, the set of chip sequences may comprise only two chip sequences. In this case, the chip sequences may as previously mentioned be the inverse of each other, and specifically one may arise from multiplication of the other by −1.

It is feasible that the first set of chip sequences may include more than one chip sequence for a given data symbol, i.e. it is possible that multiple sequences are linked to the same data symbol (for example with the chip sequences having different lengths). However, typically each chip sequence will be linked to one data symbol, and one data symbol will be linked with only one chip sequence of the first set of chip sequences.

It will be appreciated that such a binary approach with two inverse chip sequences being used is equivalent to considering that the two possible binary values are modulated by the same chip sequence but with the data symbols having opposite data values (e.g. +1 and −1).

When the power receiver is about to transmit a data symbol, the value is fed to the data transmitter 509 from the power receiver controller 501 and then the corresponding chip sequence is retrieved from the chip sequence store 511. In the binary case, this chip sequence may be generated by multiplying a common stored chip sequence and the symbol value.

The determined chip sequence is then fed to the data transmitter 509 which is arranged to control a switchable load for the input circuit to modulate the appropriate chip sequence on the power transfer signal. In the example, data transmitter 509 may be arranged to switch in and out (on/off) a modulation load in accordance with the chips of the chip sequence, i.e. the load may be changed in accordance with the modulation load values of the chip sequence. Typically, the data transmitter 509 may be arranged to switch in/out a communication capacitor e.g. positioned in parallel with the power receiver controller 501 or with the resonance capacitor 503 thereby being able to vary the resonance frequency and the loading of the power transfer signal Thus, in the example, each symbol (typically bit) time interval is divided into a plurality of (e.g. 31) chip intervals with the modulation load being constant within each chip interval and with the modulation loads varying (changing or not changing) between chip intervals in accordance with a pattern which is different for each data symbol.

In order to receive load modulation in accordance with the first communication mode, a power transmitter must have the required functionality for supporting chip sequence based communication. FIG. 2 is an example of a power transmitter that is capable of receiving data from the power receiver 105 of FIG. 5 transmitted in accordance with the first communication mode.

The power transmitter 101 of FIG. 2 comprises a load detector 209 which is arranged to detect load variations of the power transfer signal, and specifically it may determine a load variation sequence of the power transfer signal and/or drive signal. The load variation sequence may thus correspond to the received chip sequences when data is being transmitted. For example, the load value of the drive signal (e.g. the current and/or power) may be measured and sampled at time intervals corresponding to the chip intervals during a time when a message is (expected to be) received from the power receiver. In some cases, the values may be normalized and quantized, e.g. if binary chip sequences are used, the load detector may generate a sequence of binary values e.g. representing a higher load and a lower load. Thus, a received chip sequence of load modulation is generated from the sampling of the signal(s) of the output circuit.

The load detector 209 is coupled to a load modulation receiver 207 to which it provides the received load variations (which corresponds to a chip sequence of modulation load values). The load modulation receiver stores a set of reference chip sequences which specifically correspond to the chip sequences stored and used by the power receiver. Thus, the load modulation receiver 207 stores the chip sequences of the first set of chip sequences, and the power receiver and the power transmitter have stored local replicas of the chip sequences linked with the data symbols The power transmitter 101 comprises a local representation of the chip sequences used by the power receiver. The power receiver and the power transmitter have stored corresponding links between reference chip sequences and data symbols.

In the example, the load modulation receiver 207 may store only a single data symbol chip sequence, namely that used to modulate the binary data symbols (and thus with the single stored data symbol chip sequence being equal to the chip sequence representing one binary data value and the inverse (typically sign inverted) chip sequence representing the other binary data value).

The load modulation receiver 207 is arranged to determine load modulation data symbols received from the power receiver in response to a correlation of the stored data symbol chip sequences (of the first set of chip sequences) and the load variations of the power transfer signal. Specifically, in some embodiments, the load modulation receiver 207 may correlate the determined load variation sequence provided by the load detector 209 with all the stored data symbol chip sequences of the first set of chip sequences to determine a correlation value for each. In cases, such as the described binary case where some sequences are the inverse of each other, only one correlation may be performed with the sign of the correlation value reflecting the correlation with two possible chip sequences.

Thus, the load modulation receiver 207 may correlate the receiver load variation sequence with the reference chip sequence(s) to determine a correlation value indicating how closely these match.

The load modulation receiver 207 may then determine the data symbol as one linked with the chip sequence for which the associated correlation value is sufficiently high such that a given threshold is exceeded. The threshold may in many embodiments be an adaptive threshold, for example the threshold may be set dependent on correlation values with other symbols. As a specific example, the threshold may be set as the value of the next highest correlation value (e.g. subject to a minimum threshold value) resulting in the data symbol being selected as the one for which the correlation value is highest (e.g. subject to it exceeding the minimum threshold value).

Thus, when operating in the first communication mode, the power receiver is capable of transmitting data to the power transmitter using load modulation with relatively long chip sequences for each data symbol, and a suitably capable power transmitter may be arranged to receive this communication. The approach may provide a substantially improved communication and operation in many embodiments. In particular, a substantially improved communication performance and reliability, and especially the symbol signal to noise ratio may be increased substantially. This may allow the modulation depth, and specifically the modulation load variations relative to the power transfer signal level/power transfer level, to be reduced substantially. Indeed, in many cases, the modulation depth may be reduced by a factor of 10, 100, or even higher. This may reduce and mitigate many of the disadvantages of using load modulation and may e.g. reduce electromagnetic interference, reduce electrical noise, reduce mechanical noise, prevent or mitigate spurious oscillations etc.

For example, using a chip rate corresponding to the bit rate used in Qi, which may be up to 2 kBps communication rate, the improvement in signal to noise ratio may be increased by an amount corresponding to the sequence length. For example, using bit lengths of 63 or 127 may increase the symbol energy to noise ratio by a corresponding amount allowing the modulation depth to correspondingly be reduced by a factor of 63 or 127 while maintaining the same bit error rate.

A disadvantage of such an approach may be that the effective communication rate may be reduced. For example, the use of sequence lengths of 63 or 127 may reduce the effective baud rate to 30.7 or 15.7 bps, respectively. In order to address this, the chip time interval duration may be reduced. The reduction may be a suitable trade-off between desired communication rate and bit error performance and can be selected for the specific application and implementation. Increasing the chip rate may have the effect that the required bandwidth and frequency spectrum of the load modulation may increase correspondingly, and potentially by a high amount. However, it is a particular advantage of the current approach that communication in a wireless power transfer system is typically not bandwidth restricted or even sensitive to the bandwidth of the communication and thus such an additional bandwidth may typically be available without impacting other functionality or performance.

In many embodiments, the system may be arranged to synchronize the load modulation communication to the power transfer signal/drive signal.

In many embodiments, the data transmitter 509 may specifically be arranged to synchronize the load modulation of the first chip sequence to the power transfer signal. The power transfer signal has an operating frequency which is typically in the range of 10 kHz-500 kHz and for Qi is often around 100 kHz. The data transmitter 509 may synchronize the chip time intervals to be synchronized to the oscillations and periods of the power transfer signal. For example, in many embodiments, the data transmitter 509 may use a chip duration/time interval which is a multiple of the power transfer signal period. Thus, each chip may have a duration that is a multiple of the period time of the power transfer signal, i.e. the duration of the chip interval may be N*T where N is an integer and T is the duration of a period of the power transfer signal/drive signal.

In many embodiments, the data transmitter 509 may not only synchronize the duration of the chip intervals to the durations of the periods of the power transfer signal but may also time the start and/or stop timings of the chips to the timing of the power transfer signal. Specifically, the transition times between chips may be synchronized to occur at zero crossings of the power transfer signal, or e.g. with a fixed offset relative to zero crossings of the power transfer signal. It will be appreciated that the synchronization may be based on the timing of the signal inducted in the receiver coil 107 by the power transfer signal.

Similarly, the data transmitter 509 may be arranged to generate the received chip sequence from samples of the loading of the power transfer signal (possible after matched filtering being applied).

The load detector 209 may specifically sample a signal of the output circuit that corresponds to the power transfer signal, such as a current and/or power of the drive signal, a relative phase between current and voltage of the drive signal, a current through the transmitter coil 103 etc. The load modulation receiver 207 may then generate the chip sequence to correspond to the load values for these sampling times, and may proceed to determine the correlation values by correlating the received chip sequence in the form of the sampled modulation load values with the reference values.

It will be appreciated that in some approaches, the correlation may be based on hard-decision values, i.e. a direct comparison of the chip values with hard decision received chip values may be used. In some embodiments, the decisions may for example be based on soft decision modulation load/chip values. For example, for a binary transmission approach, the reference chip sequences may be binary sequences comprising only two possible values. However, the received chip sequences may be represented by soft decision values, such as values directly indicating a measured modulation load value.

In many embodiments, the load detector 209 may be arranged to synchronize the sampling to the power transfer signal, and specifically this may be achieved by synchronizing it to the drive signal.

In many embodiments, the synchronization may be of the sampling such that e.g. one sample is made per chip (possibly after matched filtering). Especially, if the chip rate is equal to N times the period of the power transfer signal, the sampling may also be synchronized to be once every N times. Thus, in many embodiments, the synchronization may be such that the sampling rate is equal to the chip frequency of the load modulation.

In some embodiments, the sampling may be a two stage process where a number of samples are generated at a higher frequency and then decimated to given sample rate. For example, for a chip duration of ten times the period of the power transfer signal, the sampler may take one sample every period. An averaging filter may then add the last ten samples, i.e. it may be a square window FIR filter that sums the ten most recent samples (with equal weights). The output of the sampling may then be the sampled output of this filter, such as specifically the output of every tenth period which coincides with the filter being a summation of the ten periods falling within a single chip. Thus, effectively the sampling at the synchronized time instants may be achieved by a suitably synchronized decimation at the output of the filter.

In other embodiments, only a single sampling of the analog signal of the output circuit is performed per chip. In such a situation the timing of the sampling may for each sample be synchronized to occur in the center of the symbol duration.

In many embodiments, the operating frequency of the drive signal and the power transfer signal may thus be an integer multiple of the sampling rate of the sampling of the signal of the output circuit and/or an integer multiple of a chip frequency of the load modulation. The multiple may be the same and may specifically be one. Indeed, in many embodiments, the integer multiple is advantageously relatively low in order to allow efficient communication and a higher data rate. In many embodiments, the integer advantageously does not exceed 1, 3, 5, 10, or 20.

Synchronization of the load modulation to the power transfer signal may in many practical implementations allow an increase of the chip rate and/or bit rate because it enables a reduction of the amount of sampling the power transmitter has to perform. In the extreme case where the chip frequency is the same as the power transfer signal frequency, the power receiver may change the load according to the chip sequence every cycle of the power transfer signal. Alternatively, the power receiver might change the load according to the chip sequence every N-th cycle of the power signal, reducing the chip frequency by a factor N.

Synchronous modulation cases modulation detection at the power transmitter side by enabling this to apply a synchronous sampling technique and correlating the detected signal to the modulation sequence after that step. The approach may typically facilitate implementation substantially while achieving an efficient communication.

The length of the chip sequences may be selected to the specific preferences and requirements of the individual embodiment and may be selected to provide a suitable compromise between communication reliability and performance (e.g. bit rate), data rate, bandwidth, modulation depth and associated disadvantages etc. In most embodiments, a length of no less than 8 and/or no more than 128 chips will provide suitable and advantageous performance for wireless power transfer systems, such as specifically for Qi systems.

In many embodiments, the first set of chip sequences may include only two chip sequences. In such examples, each symbol may be represented by one or the other chip sequence depending on the symbol value and thus each symbol may be a binary symbol (bit) and the communication may be a binary communication.

In some embodiments, the first set of chip sequences may include more than two chip sequences and more than two different symbol values are possible. For example, in some embodiments, the first set of chip sequences may comprise, say, three chip sequences allowing three different symbol values for each symbol being communicated by a chip sequence. In other embodiments, a larger number of sequences may be included allowing each chip sequence/data symbol to represent more data values thereby increasing the effective bit rate. Such an approach may in particular be suitable for longer chip sequences where larger differences in correlation values between chip sequences are feasible.

For example, for a chip length of 31 bits, 2147483648 different sequences are possible, and the system may select two sequences out of these that have high autocorrelation and low cross-correlation. Typically, the sequences may be selected as a sequence with very high auto-correlation and the binary inverse chip sequence as this will have the lowest cross-correlation (normalized cross correlation of −1 using binary values of −1 and 1). The two sequences may then be used for binary communication allowing high reliability as the correlation performed by the load modulation receiver 207 will generate substantially different correlation values for the two possible chip sequences being received.

The specific sequences and patterns used may depend on the preferences and requirements of the individual embodiment. Typically, the sequences are selected to provide good correlation properties, and specifically the set of chip sequences is selected to consist of sequences with high autocorrelation values and low cross-correlation values. In many embodiments, chip sequences may be selected as maximum length sequences. For example, in many embodiments, chip sequences may be selected as maximum length sequences generated from a polynomial, the polynomial order chosen by the power receiver in accordance with a desired/selected modulation depth and desired communication speed. Specifically, pseudo noise sequences developed for, and used in, direct sequence spread spectrum communication and code division multiple access systems may tend to also be suitable for the described approach.

As previously mentioned, the set of sequences may comprise mirror image or inverted chip sequences, i.e. for a given binary chip sequence, the set of chip sequences may also include the chip sequence for which all chips have the complementary value. For example, if the load values are represented by 1 and −1, the set of chip sequences may for each chip sequence also include the chip sequence resulting from a multiplication by −1 (equivalent to swapping between 0 and 1 for all chips for a chip sequence represented by the values of 1 and 0). Indeed, in some embodiments, the set of chip sequences may comprise only a chip sequence and the inverted chip sequence. It will be appreciated that in such embodiments, only a single representation needs to be stored to represent a pair of a chip sequence and the inverted chip sequence.

Such an approach may be particularly suitable for many applications and may result in good performance and low complexity. For example, a single correlation between a received chip sequence and a reference chip sequence can provide a correlation value for both the reference chip sequence and for the inverse chip sequence. Indeed, if there is no noise, the correlation value for one of the reference chip sequences may be +1 and the correlation value for the inverse reference chip sequence will then by −1. Thus, a single correlation value applicable to two symbol values/sequences can be determined and directly be used to select between the two symbols.

It will be appreciated that the approach of using inverted reference chip sequences can be considered equal to a multiplication of the binary data symbol and a single reference chip sequence (using the values of 1 and −1 to represent the binary values).

As a specific example, the system may when operating in the first communication mode employ the following approach:

1. The power receiver reduces the depth of load modulation significantly so that spurious oscillations do not occur, electrical and acoustic noise is reduced etc.
2. The power receiver encodes individual bits as direct (e.g., pseudorandom) chip sequences with steep autocorrelation functions.
3. The power receiver manipulates the load (typically changes the load or detunes the resonance circuit) synchronously with the power transfer signal (e.g., a transition per power signal cycle or a transition every multiple power signal cycles).
4. The power transmitter measures the load changes, e.g., by measuring the transmitter coil voltage or coil current, with a sampling time that is synchronized to the power transfer signal (e.g., one sample per power signal cycle, multiple samples per power signal cycle, or one sample per multiple power signal cycles).
5. The power transmitter decodes the data by correlating the digitized samples with the chip sequence according to which the data was modulated.
6. The chip sequence and the number of power signal cycles per symbol may be known by the power receiver and the power transmitter a priori.

An advantage of the described approach is that it provides improved backwards compatibility in many scenarios and require relatively little modifications to many power transfer systems. For example, a Qi power transfer system already uses load modulation and relatively little modification may be required to support the approach described hereinabove.

However, a challenging issue is that whereas the described first communication mode may provide excellent performance, it requires that both the power receiver and power transmitter are capable of supporting the communication approach. However, in many systems, there may be a large amount of legacy devices, potentially of both power transmitters and power receivers, which may not be able to support more advanced communication approaches such as that of the first communication mode. For example, many Qi power transmitters are deployed in accordance with the earlier versions of the Specifications which do not include such chip sequence based communication and accordingly power receivers cannot use a communication mode based on such communication to communicate with the power transmitter. Similarly, a power transmitter capable of receiving load modulation messages that are based on chip sequence modulation may be required to communicate with legacy power receivers that are not capable of using chip sequence communication.

In order to address such issues, a power transmitter and/or a power receiver may comprise functionality for communicating with other types of devices, such as e.g. with legacy devices. Thus, in addition to the functionality for communicating in accordance with the first communication mode, a power transmitter and/or a power receiver may also comprise functionality for communicating in accordance with a second communication mode, which may specifically be a legacy communication mode.

However, even if such a second legacy communication mode may be present thereby allowing a power transmitter and/or power receiver capable of chip sequence communication to communicate with legacy devices that do not have this functionality, a substantial challenge exists in how to adapt the operation of the devices in the individual scenarios. This may be particularly challenging in systems, such as Qi, where some legacy devices may potentially only be capable of communicating in one direction.

For example, in the Baseline Power Profile (BPP) of the Qi Specification, the communications occur only from the wireless power receiver to the wireless power transmitter. This may render it substantially more challenging to adapt the communication. Indeed, given such a unidirectional nature of the communications, it is not possible to let the wireless power transmitter and wireless power receiver negotiate to determine which communication format to use as would typically be feasible with the availability of the bi-directional communications used in the extended power profile (EPP) of the Qi Specification. However, in order to efficiently introduce the more advanced and better performing chip sequence modulation approach, it is also required that devices can interact with complementary devices that do not have this capability, and specifically for Qi devices it is desired that they can interact with complementary devices that meet the BPP of the Qi Specifications.

The power receiver of FIG. 5 is arranged to support chip sequence based communication while providing functionality for adapting the communication mode depending on the capabilities of the power transmitter it interacts with. It may in many embodiments allow adaptation without requiring any explicit communication from the power transmitter and specifically without any communication channel being established from the power transmitter to the power receiver. The approach may for example allow chip sequence based communication to be introduced to Qi systems while supporting and allowing interaction and interoperation with legacy devices, such as specifically legacy devices compatible with the BPP. The following description will focus on such an implementation, but it will be appreciated that the approach or concept is not limited to this specific scenario.

In the approach, the data transmitter 509 may in addition to being capable of communicating in accordance with the first communication mode also be able to communicate in accordance with a second communication mode. In contrast to the first communication mode, the second communication mode does not use the chip sequences of the first set of chip sequences to modulate data symbols onto the power transfer signal.

The second communication mode may thus use a different approach and does not use the chip sequences which in accordance with the first communication mode are linked to the possible data symbols. Rather, a second communication mode is used which load modulates the data symbols onto the power transfer signal using a different approach/standard. The second communication mode may specifically be one that is backwards compatible and supported by legacy equipment that does not support the first communication mode. Thus, the second communication mode may specifically be a legacy communication mode.

In the specific example, the second communication mode may be a communication mode that is in accordance with the BPP of the Qi Specification. The second communication mode may thus include the data transmitter 509 transmitting binary data symbols to the power transmitter by load modulating the data bits onto the power transfer signal using bi-phase encoding as prescribed by the Qi Specification. Each data symbol may in the second communication mode thus be transmitted using a Differential Manchester encoding (DM).

The second communication mode and the first communication modes are thus different, and the approach may allow a dynamic and automatic approach for a power receiver to adapt to the capabilities of the power transmitter and whether this is capable of supporting chip sequence communication using the first communication mode. If not, the power receiver will continue using the second communication mode, e.g. using a legacy communication mode.

The second communication mode may in some embodiments also use chip sequence based communication but using different chip sequences than the ones used in the first communication mode. However, in many embodiments, the second communication mode may not be a chip sequence based communication, i.e. in some embodiments, the second communication mode may employ non-chip sequence based communication. For example, in many embodiments, two binary data symbols may in the second communication mode be linked to two modulation load values. For example, for one binary value, a modulation capacitor is connected to the receiver coil 107 and for the other binary value the modulation capacitor is disconnected. The modulation load may thus be constant throughout an entire data symbol time and no modulation load changes may occur for each data symbol or within a symbol duration. Thus, in such scenarios, the power receiver may adapt to a power transmitter that does not support any chip sequence based communication but only support traditional load modulation. However, if the power transmitter does support the chip sequence based communication, the power receiver will adapt to use this modulation approach.

In some embodiments, the second communication mode does not support communication from the power transmitter to the power receiver but only from the power receiver to the power transmitter.

The power receiver is arranged to select between using the first communication mode and the second communication mode. Specifically, for a power transfer operation, the power receiver selects between using the first communication mode or the second communication mode. Typically, the selection may be made once per power transfer operation, but it will be appreciated that it may in some embodiments be more than once per power transfer, or that e.g. the same selection may be used for several power transfer operations.

In order to select between the first communication mode and the second communication mode, the power receiver 105 comprises a selector 513 which is arranged to select between the communication modes and control the data transmitter 509 to communicate the data symbols using the selected communication mode. For example, the selector 513 may select the first communication mode or the second communication mode as part of the initialization of a power transfer operation or e.g. at the outset of a power transfer phase with the selected communication mode then being used for the remaining part of the power transfer operation.

The selection of the communication mode may be based on an approach where the power receiver initially transmits a set of one or more data symbols to the power transmitter where the transmitted set of data symbols includes a request for the power transmitter to apply a variation to the power transfer signal.

The variation of the power transfer signal that is to be applied by the power transfer may for example be a variation of a frequency, phase, or level of the power transfer signal which may be imposed by applying the corresponding variations to the drive signal. The variations may be relative or absolute variations.

The power receiver may accordingly transmit a set of data symbols which requests the power transmitter to apply a given/expected variation to the power transfer signal. For example, power up or power down requests may be transmitted to the power transmitter, with the corresponding given variation corresponding to an increase, or decrease respectively, in the power level of the power transfer signal.

The set of data symbols, which in the following for brevity will also be referred to as request data symbols or bits, are transmitted using load modulation and with each data symbol being transmitted by load modulation using a chip sequence selected from the first set of chip sequences. Specifically, the request data symbols may be transmitted using the first communication mode.

The power receiver 105 further comprises a detector 515 which is coupled to the power receiver controller 501 and the selector 513. The detector 515 is arranged to monitor the power transfer signal to detect whether the expected variation of the electromagnetic signal occurs or not.

For example, the power receiver controller 501 may provide information of the power level of the power transfer signal to the detector 515. E.g. the power receiver controller 501 may continuously monitor the power fed to the load in order to support the power control loop. The measured power level of the load corresponds to the power transfer signal power level and the power receiver controller 501 may provide the measured power levels to the detector 515 The detector 515 may further be aware of the given variation that is expected in response to the request data symbols, e.g. by receiving a copy of the request data symbols or more often by the expected variation being a predetermined variation that may be stored in the detector 515. The detector 515 may then be arranged to compare the measured power levels to the expected variation to detect whether the power transfer signal varies as expected if the data symbol requests have been reacted upon by the power transmitter.

The detector 515 may then provide the result of the detection operation to the selector 513 and specifically may indicate whether expected variation has been detected or not.

The detector 515 may apply any suitable match criterion which will depend on the specifics of the individual embodiment. For example, in some embodiments, it may be detected whether the power level is increased (or decreased), e.g. by a given amount and/or for a given amount of time. In other embodiments, it may e.g. be detected whether the power level correspond to a pattern that reflects the expected variation.

The detector 515 is coupled to the selector 513 and provides information of whether the expected variation has been detected or not. The selector 513 is arranged to select between the first communication mode and the second communication mode dependent on whether the expected variation is detected or not. Specifically, if the expected variation is determined to have been detected, the selector 513 may select the first communication mode, and if the expected variation is not detected the selector 513 may select the second communication mode. The selector 513 may then control the data transmitter 509 to use the selected communication mode, e.g. typically for the rest of the power transfer phase. Thus, following the selection of the communication mode, the power receiver and specifically the data transmitter 509 proceeds to transmit data symbols to the power transmitter during using the selected communication mode.

The power transmitter of FIG. 2 may be a power transmitter that is capable of supporting the first communication mode. It may further be capable of supporting the second communication mode and thus like the power receiver 105 it may be capable of communicating with the power receiver, and specifically may be capable of receiving data from the power receiver, in accordance with both a chip sequence based communication approach using the first set of chip sequences and with legacy communication that does not use these sequences.

The load modulation receiver 207 is accordingly capable of operating in (at least) two different communication modes, with one of them using chip sequence modulation and the other typically using a legacy communication approach.

The power transmitter 101 further comprises a sequence modulation detector 211 which is arranged to detect whether any valid data symbols are received on the power transfer signal by load modulation using a sequence from the first set of chip sequences. The sequence modulation detector 211 is coupled to the load detector 209 and receives information of the power transfer signal load variations from this.

The sequence modulation detector 211 is arranged to detect whether any valid data symbols are received in response to a correlation between one, more, and typically all chip sequences of the first set of chip sequences and the load variations of the power transfer signal. Specifically, if a correlation is detected to exceed a given threshold, it may be considered that the corresponding data symbol has been received.

It will be appreciated that in many embodiments, the sequence modulation detector 211 and the load modulation receiver 207 may share functionality and in particular the sequence modulation detector 211 may be implemented by suitable elements of the load modulation receiver 207, and specifically by functionality of the load modulation receiver 207 which is also used to receive data in accordance with the first communication mode. Indeed, although not essential, the detection of the sequence modulation detector 211 may in many embodiments correspond directly to the load modulation receiver 207 seeking to receive data symbols from the power receiver in accordance with the first communication mode. Indeed, in many embodiments, the detection and the sequence modulation detector 211 may be an inherent and implicit (embedded) function of the load modulation receiver 207, and specifically an implementation of the load modulation receiver 207 may inherently be an implementation of the sequence modulation detector 211 if some data symbols received in accordance with the first communication mode result in changes to the power transfer signal.

The sequence modulation detector 211 is coupled to an adapter 213 which is arranged to apply a variation to the power transfer signal in response to the detection of the validly received data symbol. The adapter 213 may specifically be arranged to control the power receiver controller 501 to control the driver to modify the power receiver in response to the received data symbols. Specifically, the received data symbols may be request data symbols as previously described, and the adapter 213 may be arranged to control the power receiver controller 501 and driver 201 to apply the variations to the power transfer signal as requested by the requested data symbols.

For example, in some embodiments, the detected data symbols, may be power change requests, such as specifically power control error messages. The power transmitter may adapt the power level of the power transfer signal to reflect the power change requests/control errors. Thus, the adapter 213 may in some embodiments be part of the power change circuit, and may specifically be part of the power control loop functionality.

The power transmitter further comprises a power transmitter communication selector 215 which is arranged to select between the first communication mode and the second communication mode and to control the load modulation receiver 207 to use the selected communication mode.

When in the first communication mode, the load modulation receiver 207 thus receives load modulated data symbols by correlating the load variations of the power transfer signal with the sequences of the first set of chip sequences and determining the received data symbol in response to the correlation.

When in the second communication mode, however, the load modulation receiver 207 does not correlate with the first set of chip sequences but rather seeks to receive data in accordance with a different communication mode (which specifically may be a legacy communication mode). In the specific example the load modulation receiver 207 receives data symbols modulated in accordance with the original communication approach of the Qi Specifications.

The selection of the communication mode is dependent on whether data symbols are detected by the sequence modulation detector 211. Specifically, the power transmitter communication selector 215 is arranged to select the second communication mode as a default. Specifically, when not engaged with a power transfer, e.g. as part of the termination of a power transfer, the power transmitter communication selector 215 may set the communication mode to the second communication mode. Thus, the power transmitter may be set up to transmit in accordance with the legacy communication mode. However, if the detection indicates that a detection of a data symbol modulated by a sequency of the first set of chip sequences is received, the power transmitter communication selector 215 may switch the load modulation receiver 207 to use the first communication mode.

It will be appreciated that in some embodiments, the power transmitter 101 and specifically the load modulation receiver 207 may be arranged to simultaneously operate in the first communication mode and the second communication mode when receiving data from the power receiver.

Thus, the power receiver 105 of FIG. 5 and the power transmitter 101 of FIG. 1 are both capable of communicating using chip sequence communication in accordance with the first communication mode. Further, the power transmitter 101 and the power receiver 105 are capable of adapting the communication to use the second communication mode. The power receiver 105 may transmit data symbols using the first set of chip sequences, and if this is followed by a detection of the expected changes in the power transfer signal, then the power receiver 105 selects the first communication mode and proceeds with this communication mode. Similarly, the power transmitter 101 is arranged to switch to the first communication mode in response to receiving the data symbols using the first set of chip sequences. It further introduces the expected variations to the power transfer signal.

Thus, the power receiver 105 and the power transmitter 101 are arranged to interwork to establish that the first communication mode is a feasible communication mode and to switch to use this communication mode.

The power receiver 105 and the power transmitter 101 of FIGS. 5 and 2 respectively, are accordingly arranged to interwork to adopt the more advanced first communication mode thereby allowing the advantages provided by this. Further, the power receiver 105 and the power transmitter 101 are both individually capable of communicating in accordance with a (typically) legacy communication mode. For example, if the power transmitter 101 is used with a legacy power receiver (rather than the one of FIG. 5), the power transmitter will be arranged to receive data from this power receiver, and accordingly it can support a power transfer operation with the legacy power receiver. Similarly, the power receiver 105 can interact and transmit data to a legacy power transmitter and can proceed to set up a legacy power transfer operation with this.

Further the devices can automatically adapt and select an appropriate communication mode. In the situation where both the power transmitter and the power receiver are capable of communicating using the first communication mode, they can both adapt to select and use this communication. If not, the second communication mode will be selected. For example, the power transmitter and power receiver may be arranged to initialize power transfer operations using the second communication mode and then switching to the first communication mode if the request data symbols are successfully received and result in the expected power transfer signal variations. The devices may thus automatically adapt to use the appropriate communication mode, and specifically may automatically switch to use the preferred first communication mode when feasible. Further this may be achieved without requiring any data transmission or communication channel from the power transmitter to the power receiver.

The approach may thus overcome the limitation of not having a wireless power transmitter to wireless power receiver communications channel, and yet may introduce the chip sequence based communication scheme in a backwards compatible way based on the power receiver sending a chip sequence modulated data packet/set of symbols to the power transmitter and detecting whether the latter exhibits an expected/predetermined behavior.

The power receiver may specifically in many embodiments mix the chip sequence modulated data packets with backwards compatibility data packets, i.e. specifically it may mix data symbols transmitted in accordance with the first communication mode and symbols transmitted in accordance with the second communication mode. The data packets may be transmitted such that they satisfy all timing and content requirements of the appropriate Specifications, and specifically of the legacy Specifications that may be used by some devices of the system. For example, they may satisfy the requirements of the legacy or original Qi Specification. A legacy power transmitter will not detect the chip sequence modulated data packets but rather these will be seen as noise on the channel, and they will therefore be ignored by the power transmitter. However, the power transmitter will receive the data messages transmitted using the legacy modulation. Accordingly, a legacy power transmitter will react as if only the data packets using the legacy communication mode were transmitted. In contrast, a chip sequence modulation capable power transmitter will also be able to detect the chip sequence modulated data packets and it will respond to these by modifying the power transfer signal. These changes to the power transfer signal can be detected by the power receiver and can be differentiated to the changes that would occur if only the legacy data packets were received. In this way, the approach allows a power receiver to determine whether the power transmitter is a chip sequence modulation capable power transmitter or whether it is a legacy power transmitter that does not support this.

The approach may in many scenarios provide a backwards compatible approach facilitating a transition from the use of the legacy communication approach to the use of chip sequence based communication without requiring any communication channel from the power transmitter to the power receiver.

As previously described, the request data symbols may in many embodiments comprise at least one request for a change of the power level of the power transfer signal. The power transmitter 101 may in response to receiving this request proceed to change the power level as requested. As will be known to the skilled person, the change may be e.g. by changing the power level (current and/or voltage) or frequency (for resonant couplings this will also change the power level of the power transfer signal) of the drive signal, thereby increasing the effective electromagnetic field strength/power transfer.

In many embodiments, the request data symbols are transmitted as part of the power transfer phase. For example, a power receiver may proceed through the standardized steps to initialize a power transfer using only the second communication mode, i.e. specifically in many embodiments using the legacy communication mode. It may indeed begin the power transfer using the second communication mode and at some point (typically immediately after starting the power transfer), the power receiver may transmit the request data symbols using the first communication mode. The request data symbols may request power level changes and if the power receiver then detects these changes, the communication may be switched to the first communication mode for potentially all data transmissions.

In many embodiments, the request data symbols may specifically include/comprise/consist of one or more power control loop error messages. Thus, the power receiver may during the power transfer phase transmit power control loop error messages to the power transmitter to support the power control loop. The power receiver may for example start sending these error messages (which specifically may be power up or power down requests) using the second communication mode. At some point, however, the power receiver may switch to transmit one, more, or all of these error messages using the first communication mode. If this still results in the power level of the power transfer signal being controlled and adapted in accordance with the error messages, the power receiver may permanently (for the power transfer) switch to the first communication mode. Otherwise, it may switch back to the second communication mode for future error control messages.

As a specific example, the power receiver may use conventional/legacy communications (the second communication mode) to proceed to the power transfer phase and then start to test whether the power transmitter supports chip sequence based communications (the first communication mode). FIG. 7 may illustrate such an example. In FIG. 7, the white text background indicates communication in accordance with the second communication mode and the black text background indicates communication in accordance with the first communication mode.

In such an example, the wireless power receiver may send conventional control error data packets containing a value of zero (CE/0), and chip sequence control error data packets containing non-zero values (CE/x). A legacy wireless power transmitter will receive only the conventional data packets and will therefore keep the transferred power at a constant level. However, an enhanced power transmitter supporting chip sequence communication may also receive the chip sequence data packets and it will accordingly increase the power level (because of the non-zero values). Accordingly, the wireless power receiver can differentiate between a legacy and a new wireless power transmitter depending on the variation of the power level of the power transfer signal.

In some embodiments, such as the above example, the power receiver may thus be arranged to transmit request data symbols both in accordance with the first communication mode and the second communication mode, i.e. a first set of data symbols may be transmitted in accordance with the first communication mode and a second set of data symbols may be transmitted in accordance with the second communication mode. The two data sets may be such that the variation of the power transfer signal in case only the second set of data symbols (transmitted in accordance with the second communication mode) are received is different to the variation that results if both data sets are received. The power receiver may accordingly determine if the measured variation of the power transfer signal matches that resulting from both data sets being received and to switch to the first communication mode if so. If instead, the power transfer signal variation more closely matches that of only the requests of the second set of data symbols, then the power receiver may switch to only use the second communication mode.

In many embodiments, the two data sets transmitted in accordance with the first communication mode and second communication mode respectively may request different changes/variations and the selector 513 may be arranged to select between the different communication modes dependent on whether the detected change/variation more closely matches the combined change/variation resulting from both data sets or whether it more closely matches the change/variation resulting from only the second set of data symbols, i.e. of only the request data symbols transmitted using the second communication mode.

In many embodiments, the first set of request data symbols transmitted in accordance with the first communication mode may request an opposing change to that requested by the second set of request data symbols transmitted in accordance with the second communication mode. For example, the second set of request data symbols may consist in power down requests and the first set of request data symbols may consist of power up requests. The combined effect of these requests may be a constant power level whereas the effect of only the second set of request data symbols is a continuous reduction in the power level. The power receiver may then simply detect whether the power level stays substantially the same, in which case the first communication mode is selected, or whether it decreases, in which case the second communication mode is selected. After selection, normal power control loop operation may be resumed or initialized with the control error messages being transmitted using the selected communication mode.

In some embodiments, the power receiver may be arranged to alternate between sequences of one or more conventional power control error messages and sequences of one or more chip sequence modulated power control error messages.

In some embodiments, such as e.g. for a Qi system, the power receiver may first control the power to a desired level using conventional control error data packets (e.g. Qi CE data packets) containing positive values (requesting a power level increase) and subsequently alternate between conventionally modulated control error data packets containing negative values (requesting power down) and chip sequence modulated control error data packets containing positive values (requesting power up). If the power level goes down, the wireless power transmitter may be considered a legacy power transmitter, and if it stays close to the desired level, the power transmitter may be considered a chip sequence capable power transmitter.

It will be appreciated that in many embodiments more complex variations may be used, such as for example a specific power level variation pattern being requested and with the detection being in response to a correlation of this pattern with the detected power level variations.

In some embodiments, the request data symbols transmitted using the first communication mode may be a request for an end of the power transfer, and specifically it may be a request for a power transfer to be terminated. If the power transmitter proceeds to terminate the power transfer, the power receiver may consider that the power transmitter is not a legacy power transmitter, and a new power transfer may be initialized based on communication in accordance with the first communication mode. Thus, the selector 513 may select the first communication mode if an end of the power transfer is detected and otherwise it may continue using the second communication mode.

For example, the power receiver may use legacy communications to proceed to the power transfer phase. When desiring to test whether the power transmitter supports chip sequence communications, the power receiver may transmit a chip sequence modulated EPT (End Power Transfer) data packets (mixed with the conventional data packets) to the power transmitter. A legacy power transmitter will not detect these EPT data packets and will therefore continue the power transfer. However, a suitable equipped power transmitter will restart the power transfer as requested, indicating to the wireless power receiver that it can switch to chip sequence communications when it restarts the power transfer.

In some embodiments, the power receiver and power transmitter may be arranged to adapt a communication parameter for the first communication mode, the communication parameter may specifically be a chip sequence length and the following description will focus on this example. However, it will be appreciated that in other embodiments other communication parameters may be adapted, such as a data rate, a modulation depth.

In some embodiments, the first communication mode may be initialized using a default operating parameter, and specifically a default chip sequence length. After setup, the data transmitter 509 may transmit some request data symbols using a different communication parameter, and specifically may transmit some request data symbols using a different chip sequence length. The selector 513 may then detect whether the subsequent variation matches the request of these request data symbols or whether it matches a variation that would result if the request data symbols transmitted using the modified communication parameter have not been received. In the former case, the selector 513 may proceed to change the communication parameter to the new value, and otherwise it may proceed to use the previous value for the communication parameter.

As a specific example, such an approach may be used to determine or adapt a modulation depth. When communicating in the first communication mode, the power receiver can start using a different modulation depth. If the power transmitter can still receive the data symbols (of the power up or power down requests), the power receiver will see the power levels to vary as requested, and it knows it can proceed using the new modulation depth. However, if the power transmitter can no longer receive the data symbols reliably (e.g. there are too many bit errors), the power receiver will not see the power level deviate from the expected variation, and it can revert to the previous modulation depth.

As another example, the approach may be used to change or adapt a chip sequence length.

For example, when communicating in the first communication mode, the power receiver may be arranged to select between different chip sequence lengths depending on the conditions, such as e.g. noise, attenuation etc. It may for example be arranged to switch between a shorter and a longer chip sequence.

For example, if the power receiver when using a shorter chip sequence does not see the power level vary as expected from the data symbols (power up/power down) transmitted to the power transmitter, it may expect that the power transmitter does not receive those data symbols reliably. In particular, it may suspect that bit errors due to a too low signal-to-noise ratio may be the cause. If it is known that the power transmitter can use the different sequence lengths it may switch to the longer sequence directly. However, it may when operating with the longer chip sequence seek to switch to the shorter sequence. It may for example do so using the following approaches:

a) The power receiver can start to mix data symbols transmitted using respectively the shorter and longer chip sequences, with the data symbols using the longer chip sequence requesting the power level to stay constant, and the data symbols using the shorter chip sequence requesting the power level to increase or decrease. When it sees the power level changing as expected (increasing or decreasing), it can continue to use the shorter chip sequence only.

b) The power receiver can stop using the longer chip sequence and start using the shorter chip sequence for the data symbol it uses to request a power level change. If it does not see the power level change, it assumes that the power transmitter cannot currently reliably receive the shorter chip sequence and the power receiver therefore reverts to using the longer sequence. On the other hand, if it does see the power level changes as expected, it continues to use the shorter chip sequence.

As another example, when communicating in the first communication mode, the power receiver may start by using chip sequences with a length that any power transmitter supporting the first communication mode can receive. However, some power transmitters may also be capable of using longer chip sequences, and the power receiver may accordingly seek to potentially increase the chip sequence length in order to increase the signal-to-noise ratio and thereby provide more reliable communication. Different approaches that the power receiver may utilize in such a case can include:

a) The power receiver can start to mix data symbols transmitted using respectively the shorter and longer chip sequences, with the data symbols using the shorter chip sequence requesting the power level to stay constant, and the data symbols using the longer chip sequence requesting the power level to increase or decrease. When it sees the power level changing as expected (increasing or decreasing), it can continue to only use the longer chip sequence.

b) The power receiver can stop using the shorter chip sequence and start using the longer chip sequence for the data symbol it uses to request a power level change. If it does not see the power level change, it assumes that the power transmitter cannot receive the longer chip sequence and reverts to using the shorter sequence. On the other hand, if it does see the power level changes as expected, it continues to use the longer chip sequence.

In the above sequence length adaptation examples, the power receiver can assist the power transmitter by informing this that it will start to use a chip sequence with a different length, and e.g. whether it will do so by mixing data symbols of the shorter and longer chip sequences, or whether it will start to use the other length chip sequence exclusively (for data symbols requesting the power level to change). As part of this messaging, it can indicate for how long it will use the other length chip sequence before reverting to the current length chip sequence. This can enable the power transmitter to optimize its communications decoding.

In both cases, the power receiver can assist the power transmitter by informing this that it will start to use the shorter chip sequence, and whether it will do so by mixing data symbols of the shorter and longer chip sequences, or whether it will start to use the shorter chip sequence exclusively (for data symbols requesting the power level to change). As part of this warning, it can indicate for how long it will use the shorter chip sequence. This can enable the power transmitter to optimize its communications decoding.

In the above examples, the approach has been applied after power transfer initialization and during the power transfer phase. However, in some embodiments, the approach may be applied prior to the power transfer phase.

Specifically in some embodiments, the data transmitter 509 may be arranged to transmit the request data symbols in response to a detection power transfer signal being generated by the power transmitter. The detection power transfer signal may be an electromagnetic detection signal generated by the power transmitter prior to a power transfer phase. The detection power transfer signal may specifically be an electromagnetic detection signal generated to indicate the presence of the power transmitter to the power receiver and for allowing the power transmitter to detect the presence of a power receiver.

The detection power transfer signal is generated by the transmitter coil 103 and may also transfer power from the power transmitter to the power receiver (albeit typically very small values). The detection power transfer signal is thus also a power transfer signal.

The detection power transfer signal may specifically be a ping signal. The detection power transfer signal may specifically be a ping signal in accordance with the Qi Specifications, and specifically in accordance with the Qi Specifications versions 1.0 or later.

In such an example, the power receiver may thus transmit request data symbols on the detection power transfer signal/ping signal and the power transmitter may respond by applying a corresponding variation to the power transfer signal if it is able to receive the request data symbols. If the power receiver detects the corresponding expected variations, it may proceed to initialize the power transfer phase using the first communication mode and otherwise it may use the second communication mode.

As a specific example, the power receiver may transmit a special test chip sequence in response to detecting a detection power transfer signal. The chip sequence may be a chip sequence of the first set of chip sequences. A legacy power transmitter may ignore this chip sequence, but a first communication mode compatible transmitter may detect it and proceed to apply e.g. a predetermined variation to the detection power transfer signal. The power receiver may then monitor for this predetermined variation and select between the first communication mode and the second communication mode depending on whether it is detected.

As a specific example for a Qi System, a power receiver may transmit a test chip sequence to the power transmitter before responding with a conventional SIG data packet to a digital ping from the wireless power transmitter. A legacy wireless power transmitter will see this as noise and will wait for the conventional SIG data packet. It will then proceed with the power transfer setup using the legacy approaches. A first communication mode capable wireless power transmitter, however, can be configured to provide a signature/variation on the Digital Ping signal to indicate that is has detected the test chip sequence. A simple signature/variation may be a change (e.g. a step) in the operating frequency or power level of the Digital Ping signal. When the wireless power receiver detects the signature/variation, it may then proceed with chip sequence data packets (the first communication mode) and potentially may not use conventional data packet communication at all.

Figure 8:
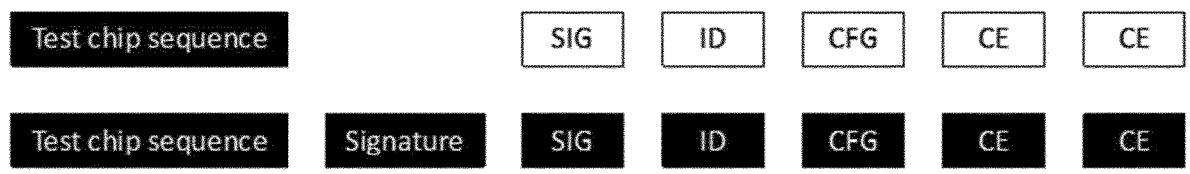
FIG. 8 illustrates an example of a communication exchange in accordance with some embodiments of the invention.

FIG. 8 illustrates such an example where a white background indicates communication in accordance with the second communication mode and the black background indicates communication in accordance with the first communication mode.

FIG. 8 illustrates an example where the power transmitter is a legacy power transmitter (upper half) and an example where the power transmitter supports chip sequence communication (lower half). In the former case, the wireless power transmitter does not detect the test chip sequence and the wireless power receiver proceeds to use the legacy communication method. In the latter case, the wireless power transmitter does detect the test chip sequence and introduces a signature variation to the Digital Ping signal. The wireless power receiver recognizes this signature variation and proceeds to use chip sequence based communication only.

In some embodiments, the second communication mode may be a low bandwidth communication mode. Typically, each data symbol may be modulated by a data symbol shape having a bandwidth (e.g. 3 dB bandwidth) that does not exceed $N \cdot 1/T$ where N is an integer no higher than 4 and T is the data symbol time. In many embodiments, the bandwidth may not exceed $2/T$.

The chip sequence lengths for the first set of chip sequences are typically relatively long and typically comprise e.g. 16 or more chips. The bandwidth of data symbols modulated in accordance with the first communication mode is typically substantially higher than for data symbols modulated in accordance with the first communication mode.

In some embodiments, each data symbol may be modulated by a chip sequence having a bandwidth (e.g. 3 dB bandwidth) no less than $N \cdot 1/T$ where N is an integer no lower than 8 and T is the data symbol time (T may also be considered the chip sequence length). In many embodiments, the bandwidth may not be less than $16/T$.

In many embodiments, each chip sequence of the first set of chip sequences may comprise no less than 4, 8, or 16 load modulation level changes. In contrast the second communication mode may in many embodiments include no more than 1 or in some embodiments 2 load modulation levels per data symbol. The second communication mode may include a maximum of one load modulation level change for a data symbol.

In many embodiments, the second communication mode may specifically use a bi-phase encoding. In many embodiments, each data symbol may in the second communication mode be transmitted using a Differential Manchester encoding (DM) Each data symbol may be linked to a specific DM encoding sequence.

In some embodiments, the second communication mode may comprise each data symbol being modulated by a sequence of modulation load values corresponding to a chip sequence of a second set of chip sequences where the chip sequences of the second set of chip sequences are linked to different data symbol values. However, the chip sequences of the second set of chip sequences are different from those of the first set of chip sequences, and specifically the lengths of the chip sequences of the two sets are typically different, with often the second set of chip sequences being shorter than those of the first set of chip sequences, typically by a factor of no less than 2, 4, 8, 16 or even more.

For example, in some embodiments, the first set of chip sequences may comprise chip sequences having a length of no less than 15, 31, 63, or 127 chips, and the second set of chip sequences may comprise two chip sequences having a length of 2 chips. For example, the second set of chip sequences may for a binary communication comprise one chip sequence of two identical load modulation values and one chip sequence of two different load modulation values. Thus, one binary data symbol may be represented by a channel data symbol with no load changes and on binary data symbol may be represented by a channel data symbol with one load change or transition. For example, a Manchester encoding may be used.

In some embodiments, the first and second set of chip sequences may comprise chip sequences that have the same length but with the two sets still comprising different chip sequences. The two sets may typically have chip sequences with good autocorrelation properties and with good cross-correlation properties relative to not only other sequences in the same set, but also relative to sequences in the other set.

Such an approach may for example allow an upgrade to an existing system to allow additional chip sequences to be used.

For example, a wireless power system may be deployed which uses binary chip sequence communication with one chip sequence being defined and the two binary values being represented by the chip sequence and the inverse chip sequence. Thus, a number of legacy devices may be arranged to communicate using a binary chip sequence communication based on a two inverse chip sequences. Such an approach may provide suitable operation in many embodiments. However, it may at some point be realized that it is advantageous to expand to use additional chip sequences. For example, it may be advantageous to introduce alternative chip sequences pairs that can be selected for binary communication. This may for example allow increased interference performance as e.g. more chip sequences are available for selection. It may for example allow different power receivers to be positioned closely together without the communication causing too much cross-interference as different sequences can be applied to the different power receivers. Such a scenario may for example occur in situations where a power transmitter device comprises multiple coils and functionality for simultaneously powering multiple power receivers.

However, in such a case, some power receivers may be recent power receivers arranged to communicate using any of the chip sequences whereas other power receivers may be legacy power receivers that only support sequences of the second set comprising the legacy chip sequences. Similarly, some power transmitters may be arranged to communicate using any chip sequence, whereas other power transmitters may be legacy power transmitters that are only capable of communicating using chip sequences of the second set.

In such cases, the described approach may be used to allow adaptation to include additional chip sequences of the same length. New power transmitters may be introduced with two communication modes, one being a legacy mode using a second set of sequences and the other being a new mode using a different set of sequences that are different but have the same length as the second set. A legacy power receiver will communicate using the second set of sequences and such a power receiver can be supported by any power transmitter. A new power receiver may e.g. when first detecting a power transmitter try to communicate with the power transmitter using a chip sequence of the first set and with the communication requesting a variation of the power transfer signal. If this variation is subsequently detected, the power receiver may proceed using the chip sequence of the first set and otherwise it may switch to using a chip sequence of the second set.

Thus, the arrangement may bias power receivers towards using the new chip sequences when possible while still supporting legacy devices.

A modulation load may be a load component of the loading of the power transfer signal/drive signal caused by/depending on/varying with the load modulation.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. The inclusion of a feature in a dependent claim of one independent claim does not imply a limitation to this independent clam but rather indicates that the feature is equally applicable to other independent claims as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example shall not be construed as limiting the scope of the claims in any way.

The invention claimed is:

1. A power receiver comprising:
  an input circuit comprising a receiver coil, wherein the receiver coil is arranged to extract power from a power transfer signal;
  a transmitter circuit,
    wherein the transmitter circuit is arranged to transmit a first plurality of data symbols to a power transmitter by load modulating the power transfer signal,
    wherein the transmitter circuit is arranged to transmit data symbols to the power transmitter during a power transfer phase using a selected communication mode;
  a detector circuit, wherein the detector circuit is arranged to monitor the power transfer signal so as to detect the first variation of the power transfer signal; and
  a selector circuit,
    wherein the selector circuit is arranged to select a first communication mode as the selected communication mode if the first variation of the power transfer signal is detected,
    wherein the selector circuit is arranged to select a second communication mode as the selected communication mode if the first variation of the power transfer signal is not detected,
    wherein the first communication mode comprises modulating each data symbol of the first plurality of data symbols by a sequence of modulation load values,
    wherein the sequence of modulation load values corresponds to at least one chip sequence of the first plurality of chip sequences,
    wherein the plurality of data symbols comprises a request for the first variation of the power transfer signal,
    wherein the second communication mode does not modulate any data symbol by a sequence of modulation load values corresponding to any chip sequence of the first plurality of chip sequences.

2. The power receiver of claim 1,
  wherein the second communication mode comprises modulating each data symbol by a sequence of modulation load values,
  wherein the sequence of modulation load values corresponds to at least one chip sequence of a second plurality of chip sequences.

3. The power receiver of claim 2,
  wherein each chip sequence of the first plurality of chip sequences has a first length,
  wherein each chip sequence of the second plurality of chip sequences has a second length,
  wherein the second length is different from the first length.

4. The power receiver of claim 1, wherein the first variation of the power transfer signal is a variation of a power level of the power transfer signal.

5. The power receiver of claim 1, wherein the first plurality of data symbols comprise at least one power level change request for the power transfer signal.

6. The power receiver of claim 1, wherein the first plurality of data symbols comprise at least one power control loop error message.

7. The power receiver of claim 1,
  wherein the transmitter circuit is arranged to transmit a second plurality of data symbols in the second communication mode,
  wherein the second plurality of data symbols comprises a second variation of the power transfer signal,
  wherein the second variation of the power transfer signal is different than the first variation of the power transfer signal,
  wherein the detector circuit is arranged to detect the first variation of the power transfer signal based on whether a change of the power transfer signal is a closer match to the second variation of the power transfer signal or whether the change of the power transfer signal is a closer match to a combination of the second variation of the power transfer signal and the first variation of the power transfer signal.

8. The power receiver of claim 1, wherein the transmitter circuit is arranged to transmit the first plurality of data symbols during a power transfer phase.

9. The power receiver of claim 8,
  wherein the request for the first variation of the power transfer signal is a request for an end of power transfer,
  wherein the selector circuit is arranged to select the first communication mode for a subsequent power transfer phase if an end of the power transfer phase is detected.

10. The power receiver of claim 1,
  wherein the transmitter circuit is arranged to transmit the first plurality of data symbols in response to detecting a detection power transfer signal from the power transmitter,
  wherein the first variation is a variation of the detection power transfer signal.

11. The power receiver of claim 1,
  wherein the transmitter circuit is arranged transmitting a test plurality of data symbols using the first communication mode,
  wherein the transmitter circuit is arranged to transmit a first value for a communication parameter,
  wherein the test plurality of data symbols comprising a request for a second variation of the power transfer signal,
  wherein the selector circuit is arranged to set the communication parameter to a first value if a third variation of the power transfer signal matches the second variation of the power transfer signal,
  wherein the selector circuit is arranged to set the communication parameter to a second value if the third variation of the power transfer signal does not match the second variation of the power transfer signal.

12. The power receiver of claim 1, wherein the first variation of the power transfer signal is a variation of a frequency of the power transfer signal.

13. The power receiver of claim 1, wherein each of the first plurality of chip sequences are linked to different data symbol values.

14. A power transmitter comprising:
an output circuit comprising a transmitter coil, wherein the receiver coil is arranged to generate a power transfer signal in response to a drive signal is applied to the output circuit;
a driver circuit, wherein the driver circuit is arranged to generate the drive signal;
a load detector circuit, wherein the load detector circuit is arranged to detect load variations of the power transfer signal;
a detector circuit,
wherein the detector circuit is arranged to detect a received data symbol in response to a correlation between at least one chip sequence of a first plurality of chip sequences and a first load variation of the power transfer signal exceeding a threshold;
an adapter circuit, wherein the adapter circuit is arranged to apply a variation to the power transfer signal in response to the detection of the received data symbol;
a selector circuit,
wherein the selector circuit is arranged to select a first communication mode as a selected communication mode in response to the detection of the received data symbol,
wherein the selector circuit is arranged to select a second communication mode as the selected communication mode if the received data symbol is not detected,
wherein the first communication mode comprises modulating each data symbol of the first plurality of data symbols in response to a correlation of the first plurality of chip sequences and load variations of the power transfer signal,
wherein the second communication mode does not modulate any data symbol is received in response to a correlation of the first plurality of chip sequences and load variations of the power transfer signal; and
a load modulation receiver circuit, wherein the load modulation receiver circuit is arranged to determine load modulation data symbols received from a power receiver in accordance with the selected communication mode.

15. The power transmitter of claim 14, wherein each of the first plurality of chip sequences are linked to different data symbol values.

16. A method comprising:
extracting power from a power transfer signal;
transmitting a first plurality of data symbols to a power transmitter by load modulating the power transfer signal,
wherein the transmitter circuit is arranged to transmit data symbols to the power transmitter during a power transfer phase using a selected communication mode;
monitoring the power transfer signal so as to detect the first variation of the power transfer signal;
selecting a first communication mode as a selected communication mode if the first variation of the power transfer signal is detected,
selecting a second communication mode as the selected communication mode if the first variation of the power transfer signal is not detected,
wherein the first communication mode comprises modulating each data symbol of the first plurality of data symbols by a sequence of modulation load values,
wherein the sequence of modulation load values corresponds to at least one chip sequence of the first plurality of chip sequences,
wherein the plurality of data symbols comprises a request for the first variation of the power transfer signal,
wherein the second communication mode does not modulate any data symbol by a sequence of modulation load values corresponding to any chip sequence of the first plurality of chip sequences; and
transmitting data symbols to the power transmitter during a power transfer phase using the selected communication mode.

17. The method of claim 16, wherein each of the first plurality of chip sequences are linked to different data symbol values.

18. A computer program stored on a non-transitory medium, wherein the computer program when executed on a processor performs the method as claimed in claim 16.

19. A method comprising:
generating a power transfer signal in response to a drive signal is applied to the transmitter coil;
generating the drive signal;
detecting load variations for the power transfer signal;
detecting a received data symbol in response to a correlation between at least one chip sequence of a first plurality of chip sequences and a first load variation of the power transfer signal exceeding a threshold;
applying a variation to the power transfer signal in response to the detection of the received data symbol;
selecting a first communication mode as a selected communication mode in response to the detection of the received data symbol;
selecting a second communication mode as the selected communication mode if the received data symbol is not detected,
wherein the first communication mode comprises modulating each data symbol of the first plurality of data symbols in response to a correlation of the first plurality of chip sequences and load variations of the power transfer signal,
wherein the second communication mode does not modulate any data symbol is received in response to a correlation of the first plurality of chip sequences and load variations of the power transfer signal; and
determining load modulation data symbols received from a power receiver in accordance with the selected communication mode.

20. The method of claim 19, wherein each of the first plurality of chip sequences are linked to different data symbol values.

21. A computer program stored on a non-transitory medium, wherein the computer program when executed on a processor performs the method as claimed in claim 19.

* * * * *